Oct. 25, 1960 A. R. KOLDING ET AL 2,957,946

SPEECH INTERPOLATION SYSTEM

Filed Sept. 23, 1958 5 Sheets-Sheet 1

INVENTORS A. R. KOLDING
G. N. PACKARD

BY R. O. Nimtz

ATTORNEY

INVENTORS A. R. KOLDING
G. N. PACKARD
BY R. O. Nimz
ATTORNEY

INVENTORS A. R. KOLDING
G. N. PACKARD
BY R.O. Nimtz
ATTORNEY

Oct. 25, 1960 A. R. KOLDING ET AL 2,957,946

SPEECH INTERPOLATION SYSTEM

Filed Sept. 23, 1958 5 Sheets-Sheet 4

INVENTORS A. R. KOLDING
G. N. PACKARD

BY R. O. Nimtz

ATTORNEY

SPEECH INTERPOLATION SYSTEM

Filed Sept. 23, 1958 5 Sheets-Sheet 5

INVENTORS A. R. KOLDING
G. N. PACKARD

BY R.O. Nimz

ATTORNEY 2,957,946

SPEECH INTERPOLATION SYSTEM

Aaron Robert Kolding, Basking Ridge, and George N. Packard, Bernardsville, N.J., assignors to Bell Telephone Laboratories, Incorporated, New York, N.Y., a corporation of New York Filed Sept. 23, 1958, Ser. No. 762,779

9 Claims. (Cl. 179—15)

This invention relates to electrical signal transmission systems and, more particularly, to signaling circuits for time assignment speech interpolation systems.

In many time division multiplexed signal transmission systems, such as time assignment speech interpolation systems, it is often desirable to make connections and disconnections between individual signal transmitting apparatus and the corresponding signal receiving apparatus on a nonsynchronous basis. A time assignment speech interpolation (TASI) system, for example, makes use of the "idle" periods normally occurring in human speech to transmit the speech of other subscribers, thus increasing the usefulness of the transmission facilities. Making the necessary connections for speech interpolation on a synchronous basis increases the cost and complexity of the system to a large degree. It has therefore been proposed that connections and disconnections be made only when they are required and that these connections and disconnections be controlled by ancillary supervisory signals sent over the transmission facilities. Such a system is disclosed in the copending application of F. A. Saal and I. Welber, Serial No. 686,468, filed September 26, 1957, since matured into U.S. Patent 2,935,569, issued May 3, 1960.

One of the major disadvantages of nonsynchronous multiplex transmission systems is the danger of losing track of the destinations of the various messages, resulting in the loss of all or part of the message. In a system using destination-coded supervisory signals, for example, the supervisory signal may be lost or mutilated due to noise, interference or malfunction of the system, in which case the message is not delivered to the proper receiver. This is particularly troublesome in systems such as that described in the above-mentioned application of Saal and Welber in which destinations may remain unchanged for relatively long periods of time and hence the duration for which the message is lost may be correspondingly great.

It is therefore an object of the present invention to increase the reliability of multiplex transmission systems of the destination-coded type.

It is another object of the invention to verify the accuracy of operation of a multiplex transmission system utilizing destination-coded signaling.

It is a more specific object of the invention to combine several supervisory signals for destination-coded transmission systems on a single signaling channel.

It is yet another object of the invention to signal over a single supervisory channel for both disconnection supervision and for connection verification.

In accordance with the present invention, certain supervisory information is transmitted over a signaling channel separate and apart from the message channels in a multiplex transmission facility. More specifically, a separate channel is used to transmit disconnection information as such information is required. At all other times, connection information useful in verifying or correcting previously existing connections is transmitted over the separate channel. Since the system with which the present invention finds its greatest advantages is one of the type described above in which disconnections are made only when required, disconnection is usually a relatively low activity function. It is therefore possible to send large amounts of connection checking information over this separate channel when it is not being used for disconnect signaling. On the other hand, when the system is heavily loaded and requires larger amounts of disconnection information, the connections do not continue for extended periods and connection checking becomes less essential.

In some of its broader aspects, the present invention is therefore directed to the use of a single facility to accommodate a plurality of functions. These functions are chosen such that increases in the requirements for one of these functions is accompanied by a decrease in the requirements for the other functions. In this way the single facility serves adequately to accommodate all of the functions, each in proportion to its instantaneous requirements.

In the specific illustrative embodiment of the invention shown in the drawings, these concepts are applied to a time assignment speech interpolation system of the type described in the above-mentioned application of Saal and Welber. This TASI system utilizes a fixed number of speech transmission channels to transmit the speech of a far larger number of telephone subscribers by interpolating the speech from these subscribers on the channels on a time division basis. That is, since each subscriber requires a channel only while he is actively engaged in emitting speech, each channel can be used to consecutively serve a number of talkers.

In order to route the speech from each subscriber to the proper listener, however, it is necessary that connections be set up at the remote end of the transmission facilities from the channel in use to the appropriate listener. Such connections are set up, in the illustrative embodiment, by means of signals which precede the speech fragment, or "talkspurt," on the transmission channel and which are coded to identify the appropriate destination. A system utilizing this technique has therefore been termed a "destination-coded" transmission system.

These destination codes may be lost or mutilated due to some imperfection in the transmission system, in which case all of the ensuing speech is lost entirely or is routed to the wrong listener. To avoid this result, means are normally provided to correct the connections continuously while the speech is in progress.

In order to interpolate the speech of more than one talker on each transmission channel, it is also necessary occasionally to take down the connections to each listener in order that a connection can be set up for a new listener. This process, called disconnection, may also be carried on by coded signals. It is not practical to transmit the disconnect signals over the message channels, however, because the previous listener is still connected to that channel and would hear the disconnect signals. Additionally, this method would render the connection vulnerable to inadvertent disconnection due to voice synthesis of the coded disconnect signal. As disclosed in the aforementioned Saal-Welber application, these disconnect signals may be transmitted over a separate signaling channel distinct from the speech channels. Since disconnection is a low activity function, however, this is wasteful of the channel time of the separate signaling channel.

In accordance with the present invention, connection checking information is transmitted over the signaling channel whenever it is not required for disconnect signaling. In this way, the signaling channel is more fully utilized. Furthermore, when disconnections are few, the connections remain for substantial periods of time. It is just these circumstances which require large amounts of connection checking information. Conversely, when the load on the system is high and the disconnections are relatively frequent, the connections do not remain for sufficient lengths of time for connection checking to be useful. That is, the duration of a false connection is so reduced as to be of little consequence.

The arrangements of the present invention therefore serve to completely utilize the signaling channel by allotting two inversely related functions to it. In this way the single channel remains adequate in the face of changes in the demand for each function due to corresponding but inverse changes in the demand for the other function.

These and other objects and features, the nature of the present invention and its various advantages, will appear more fully upon consideration of the attached drawings and of the following detailed description of the drawings.

In the drawings:

Fig. 1 is a general block diagram of a time assignment speech interpolation system according to the present invention;

Figs. 2 through 5, when arranged in the manner shown in Fig. 6, show a more detailed block diagram of the time assignment speech interpolation system illustrated in Fig. 1; and Fig. 7 is a graphical and qualitative representation of the output waveforms of certain of the timing circuits illustrated in Fig. 2.

GENERAL DESCRIPTION

As discussed in the introduction, the object of a time assignment speech interpolation system is to save channel time by assigning channels to talkers and listeners only when the channels are actually required, i.e., when the talkers are actively engaged in talking or making a "speech spurt." In the TASI system to be described below, time division switching techniques are utilized to make the connections between the telephone subscribers and the transmission channels. The connections between the talkers and the transmitting ends of the transmission channels, and the connections between the listeners and the receiver ends of the transmission channels are each effected through a universal-access, time-divided switching arrangement in which there is assigned one channel time slot for each speech channel interconnecting the transmitter and the receiver. A particular talker is "connected" to a channel by simultaneously gating the talker line and the transmission channel onto a common time-divided transmission bus for the same channel time slot interval and by repeating this gating operation at an eight kilocycle rate. Continuity of assignments of channels to a particular talker-listener pair for the duration of a speech spurt and thereafter is accomplished by memory units at the transmitter and at the receiver which control the party-to-channel gating operations.

Referring first to Fig. 1 of the drawings, there is shown a schematic block diagram of a time assignment speech interpolation system embodying the principles of the present invention. The system comprises a TASI transmitter and a TASI receiver which cooperate to interconnect a number of talker-listeners, one hundred and twenty in the illustrative embodiment, over an interconnecting transmission facility having a lesser number of transmission channels, thirty-seven in the system to be described. It will be understood that the system illustrated in Fig. 1 is capable of transmitting interpolated signals in one direction only. Two of such systems, one extending in each direction, are required to furnish a complete two-way communication system.

At the left of Fig. 1 there are shown a plurality of talker lines 10 which comprise the input to the TASI system. For convenience this number has been assumed to be one hundred and twenty although the invention is equally applicable to any number of input lines. A bank 11 of speech detectors is provided to monitor the speech activity of each of the one hundred and twenty talker lines. There is thus provided continuous indications of the activity of each of these lines. A scanning circuit 12 continuously "looks at" the outputs of the speech detectors 11. This may be accomplished, for example, by systematically checking each speech detector output, proceeding sequentially through all of the speech detectors. The details of such a scanning arrangement are described hereafter with reference to Figs. 2 through 5.

Each time scanning circuit 12 locates an active indication on a speech detector output, a signal is applied to code generator 13 which generates a binary number representative of the particular talker line which is active. Code generator 13 is therefore capable of generating one hundred and twenty different binary codes, one for each of the input talker lines. These codes are registered in a queuing circuit 14 which serves to store the talker identity codes in the same order in which they are generated. To this end, queuing circuit 14 has a plurality of stages of storages and is provided with means for moving the binary codes from stage to stage.

When there is room available, each of the stored talker identity codes is transferred from queuing circuit 14 into a memory circuit 15. Memory circuit 15 has one storage position for each speech channel in the interconnecting transmission facility, thirty-six in the illustrative embodiment (the thirty-seventh transmission channel is used for control signaling as will be described). Since the number of storage positions is less than the total number of input lines, there will not always be a storage position available for new identity codes. Queuing circuit 14 therefore acts as a buffer store to hold codes of newly active talkers until room is available and, furthermore, stores these codes in the exact order in which they are generated, i.e., it forms a "queue" of talker identity codes.

Memory circuit 15 is provided with a nondestructive readout mechanism which sequentially reads out all of the talker identity codes stored therein. The codes thus read out are applied to a line gate control circuit 16 which serves to operate a plurality of talker gates 38, one of which is connected in series with each talker line. Since each of the output codes from memory circuit 15 uniquely identifies a particular talker line, these talker identity codes can be used by control circuit 16, to close the gate of the identified talker line. Furthermore, since the entire contents of memory circuit 15 are applied to line gate control circuit 16 in sequence, the line gates 38 of active talkers are also operated sequentially in response to the talker identity codes.

The output of memory circuit 15 is also applied to a connect signaling circuit 40. Circuit 40 generates a signal identifying each newly active talker to be connected to the system and applies this signal to a common switching bus 108. This connect signal will be used in remote receiving equipment to connect the appropriate listener to each active talker. The connect signals are caused, by means not shown in Fig. 1, to precede the speech signals of the talker they identify.

The gating arrangement described above forms the input portion of a time divided multiplex switching system. The outputs of all of the one hundred and twenty gates 38 are connected to a common switching bus 108 to which there are also connected a plurality of speech channels 23. The number of such speech channels is determined by the average speech distribution on input talker lines 10. It has been found that average speech includes a sufficiently high percentage of silent periods to permit the interpolation of this speech on only one-third as many speech channels. For convenience, the number of speech channels has therefore been illustrated as thirty-six. Clearly, however, this number is not essential and may be greater or less than thirty-six depending on the average speech activity of the talkers.

Channel gates 39 are included in these speech channels and serve to gate speech signals from bus 108 onto the individual speech channels. These gates are controlled by channel gate control circuit 17 which in turn is driven by a pulse generator 18. Channel gate control circuit 17 serves to enable the channel gates 39 in regular succession and recurrently. The pulse rate of generator 18 is chosen such that each of channel gates 39 is enabled once each one hundred and twenty-five microseconds, i.e., at an eight kilocycle rate. The scanning of memory circuit 15 is synchronized with pulse generator 18 in such a way that each time a channel gate is enabled, a code identifying the talker assigned to the enabled channel is read out from memory circuit 15 and applied to line gate control circuit 16. The appropriate line gate is then operated simultaneously with the operation of one of the channel gates.

It can be seen from the above description that line gates 38 serve to derive amplitude modulated pulse samples from the speech signals on lines 10. Each of these pulse samples is delivered by way of bus 108 to one of the speech channels by way of one of the associated channel gates. Since the line gates and channel gates are operated in pairs, successive speech samples are delivered to each speech channel at an eight kilocycle rate. The original speech signals are reconstructed from these pulse samples by means of low-pass filters in a transmitter 24.

In accordance with the present invention, means are also provided for disconnecting a particular talker from a speech channel to make the channel available for a newly active talker. Only in this way can speech from a number of talkers be interpolated on each of the channels. Memory circuit 15 is therefore also adapted to determine when a registered talker is not active. This information, together with the talker identity codes stored in memory circuit 15 is applied to a control signal logic circuit 19.

When a channel is to be disconnected from a talker, that is, when a particular talker is inactive and his assigned channel is needed, logic circuit 19 ascertains this fact and applies this information to disconnect signaling circuit 20. Disconnect signaling circuit 20 then generates a signaling code identifying the channel to be disconnected and applies this signaling code to control channel 22. Control channel 22 is also introduced into transmitter 24.

If logic circuit 19 determines that no disconnections are required, this information is applied to error correction signaling circuit 21. The functon of circuit 21 is to transmit in succession all of the talker identity codes registered in memory 15 along with the identifications of the speech channels with which they are being connected. This information is also applied to control channel 22 and thence to transmitter 24. The use made of this information will be described hereafter but in general it may be said that the disconnect signals are utilized to disconnect listeners from the remote ends of speech channels 23 while the error correction signals are used to correct errors in the routing of the speech signals to the intended listeners.

Transmitter 24 prepares the speech signals on the thirty-six speech channels and the control signals on control channel 22 for transmission over transmission facility 101. In general, this may require modulation, multiplexing, and any other operation which will enable all thirty-six of the speech signals as well as the control signals to be transmitted over facility 101. Facility 101 may, for example, comprise a broadband submarine cable including a large number of signal repeaters and spanning vast intercontinental distances. For transmission on such a facility, the speech signals on channels 22 and 23 might be multiplexed in frequency and applied as a single broadband signal to the facility. In any case, however, all thirty-six of the speech signals and the control signals are simultaneously transmitted over the facility and recovered by a receiver circuit 25 at the remote end. Receiver 25 delivers the recovered speech signals to the thirty-six speech channels 23 and the control signals to the control channel 22. In effect then, transmitter 24, facility 101 and receiver 25 form a continuous transmission medium connecting each speech channel at the TASI transmitter to a corresponding speech channel at the TASI receiver and connecting the control channel 22 at the transmitter to the control channel at the receiver.

A bank 26 of connect signal receivers is connected to the speech channels at the receiver to monitor these speech channels for connect signals. When a connect signal is originated by circuit 40 in the TASI transmitter, this signal is picked up by one of the connect signal receivers in bank 26 and applied to a decoder 27. Decoder 27 identifies the talker to be connected and transfers this talker identity code to a memory circuit 28. Like memory circuit 15 at the TASI transmitter, circuit 28 has thirty-six memory positions or slots and a nondestructive read-out mechanism which applies these talker identity codes to a line gate control circuit 29. As before, the codes control the operation of line gates 41 in one hundred and twenty listener lines 37.

Included in each of the speech channels at the TASI receiver is a channel gate 42 which serves to connect these speech channels to a common switching bus 306. Channel gates 42 are operated sequentially by a channel gate control circuit 30 under the control of a pulse generator 31. The scanning of memory 28 is synchronized with generator 31 such that a talker identity code is read out of memory 28 each time the channel gate associated with its channel to which it is assigned is operated. These identity codes operate line gates 41 by way of control circuit 29 in synchronism with the operation of the channel gates 42. In this way, speech arriving on the speech channels is sampled by gates 42 and delivered by way of bus 306 and gates 41 to the listener lines. The talker identity codes registered in memory 28 insure that each channel is connected to the proper listener.

A control channel receiver 33 is connected to control channel 22 and receives the control signals transmitted thereover. These signals are decoded by a decoder 34. If a disconnect signal has been received, this information is passed on to a disconnect control circuit 35 which utilizes this information to erase from memory 28 the talker identity code representing the talker being disconnected. Since this code is no longed in memory circuit 28, the corresponding line gate 41 will no longer be operated and the listener will be effectively disconnected from the system.

If an error correction code has been received over control channel 22, decoder 34 supplies this information to an error correction control circuit 36. Circuit 36 utilizes this information to change the talked identity code stored in memory 28. In this way, errors caused by noise or faulty transmission on the speech channels can be rectified in a reasonable length of time.

The above description is a brief review of the operation of the TASI system of the present invention and of the major components by which this operation is accomplished. A more detailed description will be given hereafter. It is important, however, to note some of the major characteristics of the described system.

It will be first noted that this TASI system is of the "seize and hold" type. That is, a talker who is connected to a speech channel when he begins talking is not disconnected as soon as he stops talking. On the contrary, each talker retains his channel until that channel is required for another talker. In this way, the amount of control information which must be systematically transmitted to the TASI receiver is greatly reduced. In periods of low load, for example, where there are fewer than one hundred and twenty talkers to be accommodated, each talker may retain the same channel for periods long compared to the length of a talkspurt. Indeed, each talker may retain the same channel for the entire duration of his conversation if less than thirty-six talkers are connected to the system. Since control information need be transmitted only when a disconnection is required, the amount of this information is correspondingly reduced.

It will be further noted that control channel 22 serves two separate functions, the transmission of disconnect signals and the transmission of error correction signals. Disconnect signals always have priority over error correction since these signals are essential to permit interpolation. During periods of low activity, however, when few disconnections are made, erroneous connections would tend to continue for relatively long periods. It is just at these times, however, that large amounts of error correction information can be transmitted over the control channel to correct erroneous connections.

On the other hand, when the TASI system is loaded heavily with a large number of active talkers, disconnections are made rapidly to continually accommodate newly active talkers. During such periods of high activity, a large amount of disconnection information must be transmitted on the control channel, leaving little time for error correction. During such periods, however, erroneous connections will continue for only very brief intervals after which the error will be corrected by a disconnection. Hence it is just these times when error correction information is less essential that the rate of transmission of this information is decreased.

It will be further noted that, although the multiplex switching operation is a highly synchronized one, the two switching operations at the TASI transmitter and the TASI receiver need not be synchronized at all. This is possible because continuous speech waves of at least syllabic duration are constructed from the switched pulse samples before transmission. For this reason no synchronizing information need be transmitted between the transmitter and the receiver. In fact, no control information except the above-described connect, disconnect and error correction signals need be relayed to the receiver.

Having described the general block diagram of Fig. 1, a description of the detailed operation of this system will now be given.

DETAILED DESCRIPTION

Figure 1:
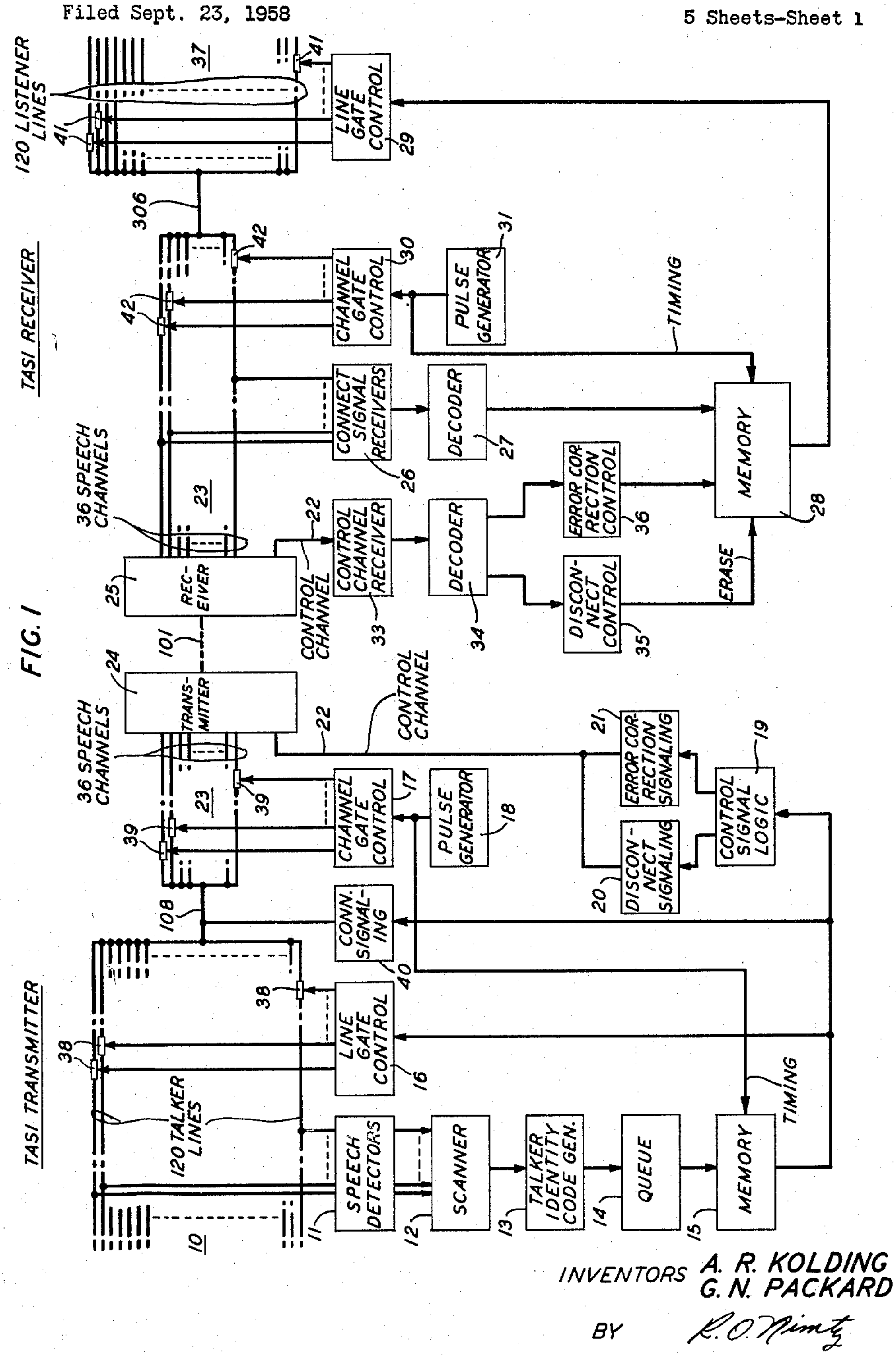
Figures 2, 6:
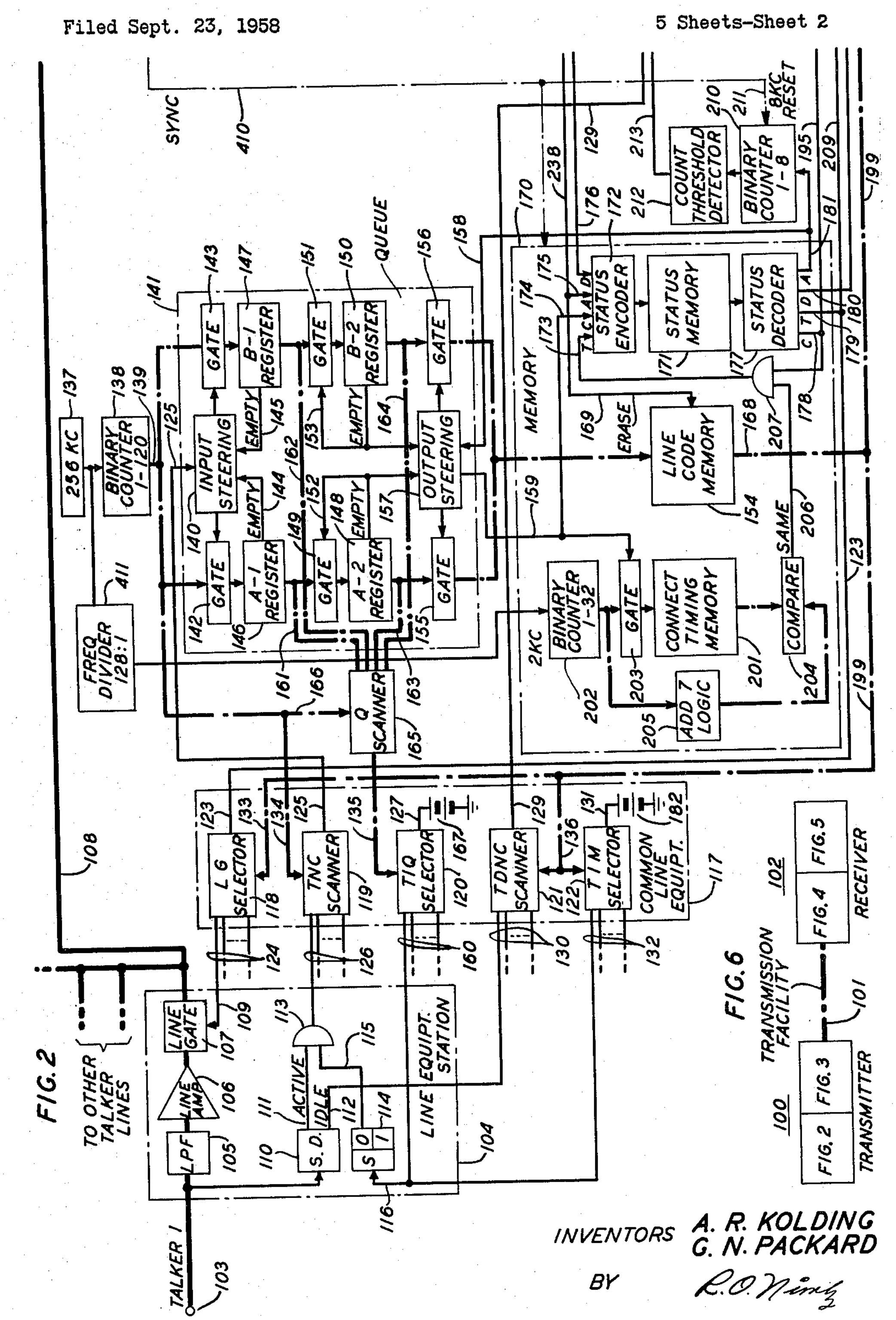

Referring now to Fig. 6 of the drawings, there is shown the manner in which Figs. 2 through 5 are arranged to form the TASI system illustrated in general form in Fig. 1 and embodying the principles of the present invention. Thus, Figs. 2 and 3 together comprise a TASI transmitter 100 while Figs. 4 and 5 together comprise a TASI receiver 102. Interconnecting TASI transmitter 100 and TASI receiver 102 is a transmission facility 101 represented schematically in Fig. 6 as a single conductor. Transmission facility 101 may, however, be any multichannel transmission medium such as a frequency multiplexed carrier transmission line, a time multiplexed transmission medium or a plurality of separate and independent transmission lines. In any event, transmission facility 101, as previously described, is capable of simultaneously carrying a large number of speech signals. In the illustrative embodiment this number is taken as thirty-six but it is to be understood that the principles of the invention are in no way defined or limited by this number, chosen solely for the purposes of convenience.

*TASI transmitter*

Proceeding to Fig. 2 of the drawings, a plurality of input terminals are provided for connecting *n* signal sources to the TASI transmitter. For the purposes of convenience, only one of these input terminals, terminal 103, has been illustrated. Connected to each of these input terminals is one of *n* line equipment stations such as station 104 illustrated as being connected to input terminal 103. For the remainder of the description, the number *n* will be assumed to be one hundred and twenty although this number may actually be any number greater than thirty-six, the number of transmission channels available in the transmission facility 101. Thus, it can be seen that the TASI system illustrated in Figs. 2 through 5 provides one hundred and twenty talker input terminals such as terminal 103, each connected to one of one hundred and twenty line equipment stations such as station 104. The description of one line equipment station will therefore serve for all.

Line equipment station 104 comprises a low-pass filter 105, a line amplifier 106, and a line gate 107 all of which are connected in series between talker input terminal 103 and a time-divided multiplex bus 108. Filter 105 serves to limit the frequency range of signals appearing on terminal 103 to the desired voice frequency range while amplifier 106 raises the level of these signals to the value required for subsequent switching operations, to be described. Line gate 107 is a normally disabled electronic switch which may be enabled by a signal on lead 109. An electronic switch suitable for this purpose is disclosed in the copending application of J. D. Johannesen, P. B. Myers, and J. E. Schwenker, Serial No. 570,530, filed March 9, 1956.

Also connected to input terminal 103 is a speech detector 110 having two output leads 111 and 112. Speech detector 110 may be any voice-operated threshold device known in the art and serves to produce a signal of a first kind, for example, a positive voltage, on output lead 111 when and only when the level of the input signal exceeds the threshold, indicating that the connected talker is active. At all other times a signal of a different kind, for example, zero volts, appears on output lead 111. Similarly, a signal of the first kind (positive voltage) appears on output lead 112 only when the level of the input signal is less than the threshold, indicating that the connected talker is idle. At all other times a signal of the second kind (zero voltage) appears on output lead 112. Thus, the signaling conditions on leads 111 and 112 are always inverse with respect to each other. A speech detector suitable for this purpose is disclosed in the copending application of J. M. Manley and P. A. Reiling, Serial No. 544,405, filed November 2, 1955, since matured into U.S. Patent 2,892,891, issued June 30, 1959.

The active output lead 111 of speech detector 110 is introduced into AND gate 113 and serves to partially enable gate 113 when carrying an active indication. The other input to AND gate 113 is derived by way of lead 115 from the reset output of a monostable timing device 114. Device 114 may comprise a monostable multivibrator of the type well known in the art having a configuration such that a signal on input lead 116 serves to trigger device 114 into one of two possible states. After a predetermined time interval following removal of the signal on lead 116, device 114 returns to the other of the two possible states. These two possible states have been indicated schematically in the drawing as "0" and "1". In the absence of any trigger input on lead 116, device 114 remains in the "zero" state, producing an output on lead 115 to partially enable AND gate 113. When enabled by a trigger signal on input lead 116, device 114 goes to the "one" state, removing the output from lead 115. A fixed time interval after removal of the trigger signal from lead 116, device 114 returns to the zero state and re-establishes an output on lead 115. It can thus be seen that gate 113 will be fully enabled any time an active indication appears on output lead 111 of speech detector 110 provided monostable device 114 has not been enabled by a trigger signal on lead 116. If device 114 is enabled by a trigger signal on lead 116, the output is removed from lead 115 and AND gate 113 is disabled.

There is further shown in Fig. 2 common line equipment 117 including from top to bottom a "Line Gate" selector 118, a "Talker Needs Connection" scanner 119, a "Talker In Queue" selector 120, a "Talker Doesn't Need Connection" scanner 121 and a "Talker in Memory" selector 122. Each of these selectors and scanners comprises a switching matrix which serves to connect a single lead to any one out of one hundred and twenty leads. Thus, Line Gate (LG) selector 118 serves to connect lead 123 to any one of leads 124. Talker Needs Connection (TNC) scanner 119 serves to connect lead 125 to any one of leads 126. Similarly, Talker In Queue (TIQ) selector 120 connects lead 127 to any one of leads 160. Talker Doesn't Need Connection (TDNC) scanner 121 connects lead 129 to any one of leads 130 and Talker In Memory (TIM) selector 122 serves to connect lead 131 to any one of leads 132. These various connections are controlled by binary coded signals appearing on the various control cables terminated in arrowheads. Thus, lead 123 is connected in LG selector 118 to that one of the leads 124 identified by a binary code appearing in parallel on a plurality of control leads illustrated schematically as control cable 133. Similarly, TNC scanner 119 is controlled by a binary pulse code on cable 134, TIQ selector 120 by a code on cable 135 and TDNC scanner 121 and TIM selector 122 by code pulses on cable 136. Binary code translation matrices of this type are disclosed in the copending application of R. L. Carbrey, Serial No. 430,181, filed May 17, 1954, since matured into U.S. Patent 2,907,829, issued October 6, 1959. The operation of the various selectors and scanners of common line equipment 117 will be described in more detail in connection with the remainder of the figures.

*Queuing*

Proceeding now to another portion of Fig. 2, a pulse generator 137 is shown driving a binary counter 138. Generator 137 may be any stable form of pulse generator known in the art but preferably includes a crystal oscillator having a stable oscillating frequency of 256 kilocycles. Binary counter 138 may be any form of binary counting circuit known in the art but is preferably of the "fast carry" type disclosed in the copending application of H. A. Schneider, Serial No. 593,292, filed June 22, 1956. Counter 138 serves to count the output pulses of generator 137 in binary notation and to present this count on seven digit output leads indicated schematically as cable 139. Counter 138 serves to count in binary notation from one to one hundred and twenty in regular succession and thereafter immediately recycles and begins a new count at one. For convenience, the one hundred and twenty different permutations of the code output of counter 138 may be used to identify the one hundred and twenty input terminals, one of which is shown as terminal 103. Thus it may be said that counter 138 serves to generate in succession a coded identity of one hundred and twenty different talkers connected to these one hundred and twenty input terminals. For convenience this terminology will be used hereafter.

The output of counter 138 appearing on seven digit leads, represented schematically as cable 139, is introduced into TNC scanner 119 by way of cable 134. Thus, the one hundred and twenty permutations of output codes from counter 138 cause TNC scanner 119 to scan the one hundred and twenty leads 126 in rotation. Each of the output leads 126 is connected to an AND gate, such as AND gate 113, in one of the line equipment stations, such as station 104. A signal on any one of leads 126 indicates (*a*) that the talker corresponding to that particular line station is actively engaged in speech and (*b*) that no signal appears on the corresponding output lead of TIQ selector 120 or TIM selector 122. This latter condition is true because each of the outputs of selectors 120 and 122 is connected to the input of a corresponding one of the monostable devices such as device 116.

From the above arrangements it can be seen that a talker who is active serves to produce an output signal on lead 125 of TNC scanner 119 during the time interval for which counter 138 is generating his identity code. This signal on lead 125 is introduced into input steering circuit 140 of queuing circuit 141. Input steering circuit 140 serves to operate alternately gates 142 and 143 in response to signals from TNC scanner 119. Each of these gates can be operated, however, only if a signal appears on a corresponding one of leads 144 and 145.

The operation of gate 142 serves to connect the ouptut of counter 138 to A–1 register 146 while the operation of gate 143 serves to connect the output of counter 138 to B–1 register 147. A signal on lead 144 is indicative of the fact that A–1 register 146 is empty. Similarly, a signal on lead 145 indicates that the B–1 register is empty. Input steering circuit 140 serves to gate talker identity codes from counter 138 alternately to register 146 and register 147. Gates 142 and 143 can be enabled, however, only when a signal appears on lead 144 or 145, respectively, indicating that the corresponding register is empty.

The contents of A–1 register 146 are transferred into A–2 register 148 by the operation of gate 149 and the contents of B–1 register 147 are transferred into B–2 register 150 by the operation of gate 151. Gate 149 is operated by a signal on lead 152 indicating that A–2 register 148 is empty. Similarly, gate 151 is operated by a signal on lead 153 indicating that B–2 register 150 is empty. Talker identity codes in registers 148 and 150 are transferred to a line code memory 154 of memory circuit 170 by the operation of gate 155 or gate 156. Gates 155 and 156 are controlled by output steering circuit 157. Output steering circuit 157 operates gates 155 and 156 alternately in response to a signal on lead 158, but only in the absence of a signal on lead 152, signifying that a line code is contained in A–2 register 148, or, in the case of gate 156, in the absence of a similar signal on lead 153. Simultaneously with the operation of either one of gates 155 or 156, output steering circuit 157 produces a signal on lead 159. The use of this signal will be described in detail hereafter.

From the above description it can be seen that queuing circuit 141 serves to accept talker identity codes from binary counter 138 under the control of signals from TNC scanner 119. These codes are introduced alternately into the A registers and the B registers and proceed in systematic fashion from A–1 register 146 to A–2 register 148 and out of queuing circuit 141 or from B–1 register 147 to B–2 register 150 and then out of queuing circuit 141. In this way, a "queue" of talker identities is formed in queuing circuit 141. The queue in this case has a length of four, corresponding to the four registers 146, 147, 148 and 150.

Talker identity codes are delivered from queuing circuit 141 to line code memory 154 in the same order in which they are accepted from binary counter 138. Queuing circuit 141 therefore serves temporarily to store these codes in this order for the interval between the time they are entered by a signal from TNC scanner 119 and the time they are transferred to line code memory 154. Any number of stages of storage may be added to or deleted from queuing circuit 141 to increase or decrease the queue length to any number desired. For example, removal of one entire side of the queue reduces the queue length to two. For the purposes of illustration, a queue length of four has been described. The nature and purposes of this queuing circuit have been described more fully in the above-mentioned copending application of F. A. Saal and I. Welber.

The seven-digit outputs of registers 146, 147, 148 and 150 are brought out to Queue (Q) scanner 165 by way of cables 161, 162, 163 and 164, respectively. Q scanner 165 is similar to the scanners in common line equipment 117. Signals on the conduction cables 161 through 164, are successively presented to the conductors in output cable 135 under the control of binary codes appearing on control cable 166. Control codes on cable 166 are derived from binary counter 138 but need comprise only the two least significant digits of these codes since the permutations of two digits are sufficient to represent all of the four possible input cables. Cables 161 through 164, represented schematically as single lines, actually comprise seven parallel digit leads to deliver the seven digits of the talker identity codes through Q scanner 165 to control lead 135 of TIQ selector 120. These codes thus serve to represent the talker identity codes which are presently stored in queue 141.

Each seven-digit talker identity code applied to the control cable 135 of TIQ selector 120 serves to connect a battery 167 to one of output leads 160, thereby to set the appropriate monostable circuit, such as circuit 114, and to disable the corresponding AND gate, such as AND gate 113. The period of monostable circuit 114 is chosen to be of sufficient length to include at least one complete cycle of binary counter 138. Thus, the presence of a talker identity code in queuing circuit 141 serves to block the further admittance of this same talker identity code into queuing circuit 141. Once a talker has been identified as active by the registration of his identity code in queuing circuit 141, it is not necessary to repeat this registration. Q scanner 165 and TIQ selector 120 serve to prevent these further registrations.

*Assignment*

As was described above, the talker identity codes are transferred from queuing circuit 141 into a line code memory 154. Line code memory 154 has a storage capacity of thirty-six words, each having a length of seven bits. Thus, memory 154 is capable of storing a talker identity code for each of the thirty-six speech channels of the transmission facility 101 illustrated in Fig. 5. Memory 154 is provided with a nondestructive read-out mechanism by means of which the contents of memory 154 are scanned in a systematic fashion and the stored codes presented successively on cable 168. One type of memory suitable for this purpose comprises a plurality of delay line loops, one for each bit. The digits of the words are then represented by a time sequence of pulses circulating in each delay loop. A nondestructive read-out may be provided simply by tapping these loops at preselected points. Any one of many other forms of storage would, of course, be equally suitable.

A signal on lead 169 serves to erase a single word from line code memory 154. In the case of delay line storage, this may be accomplished by opening all of the loops at the precise instant that the word to be erased arrives and by holding the loop open for the entire duration of the digit pulses representative of this word.

The output of line code memory 154, appearing on cable 168, is introduced by way of control cable 136 into TIM selector 122 and TDNC scanner 121. In TIM selector 122, the seven-digit binary codes appearing on control cable 136 serve to selectively connect battery 182 to the output leads 132. The particular one of leads 132 so connected is that one connected to the line equipment station of the talker identified by the binary code. As in the case of the outputs from TIQ selector 120, a signal on any one of leads 132 serves to set a monostable device, such as device 114, in the appropriate line equipment station. When set in this manner, device 114 removes the output from lead 115 for a predetermined interval, thus disabling AND gate 113 and preventing further registrations of that talker in queuing circuit 141. TIM selector 122 thus serves to block further registrations of talkers already registered in line code memory 154 just as TIQ selector 120 serves to block further registrations of talkers already registered in queuing circuit 141.

The thirty-six word positions of line code memory 154 corresponds to the thirty-six speech channels of transmission facility 101. Registration of a talker identity code in any one of these word positions can therefore be described as an assignment of that particular talker to that transmission channel. It can therefore be seen that the mechanism described above serves to assign active talkers to the transmission channels of the system in the order in which they become active. For convenience, we will now proceed to another portion of memory circuit 170, namely, the status memory 171.

Status memory 171 is similar to line code memory 154 except that memory 171 has a thirty-six word capacity of only two bits each. These two bits, which will be termed channel status digits, carry information as to the present status or use of the channel with which it is associated in the memory unit. These two channel status digits permit the representation in binary form of any one out of four different states or conditions of each individual transmission channel. For convenience, these states and the corresponding binary notations have been chosen as follows:

| State: | Code |
|---|---|
| Channel available for use (A) | 00 |
| Channel being signaled over for connection (C) | 01 |
| Channel being held for disconnection (D) | 10 |
| Channel being used for talking (T) | 11 |

A status encoder 172 is provided for translating a signal on any one of four input leads 173, 174, 175 or 176 to a corresponding one of these binary codes. The input leads 173 through 176 have been marked T, C, A, and D, respectively, to represent the above-defined four states. A signal on one of these four input leads causes the appropriate binary code to be entered into status memory 171 for a particular time slot corresponding to a particular channel. Similarly, the output of status memory 171 is introduced into a status decoder 177 which performs the inverse of the coding process. That is, the two digits of the binary code are translated back into a signal on one out of four output leads again marked C, T, D and A. Signals on these four output leads 178, 179, 180 and 181, respectively, are utilized to control the various operations required for the TASI system in a manner to be described below.

Before the TASI system is put into use, the status codes for all of the channels are "00," indicating that all of the channels are available for use. An output signal will therefore appear on lead 181 for each channel. This signal is applied by way of lead 158 to output steering circuit 157 of queuing circuit 141. If a talker identity code is registered in either A–2 register 148 or B–2 register 150, this code is transferred into line code memory 154 in the word position corresponding to that particular channel. Simultaneously, a signal appears on lead 159 which is applied by way of lead 174 to status encoder 172. This signal changes the status code of the assigned channel from "00" to "01," or from A to C, indicating that the channel is now being used for connection signaling. Before proceeding in the description of the connection signaling operation, the channel switching circuits will first be described.

*Switching circuits*

Figures 3, 7:
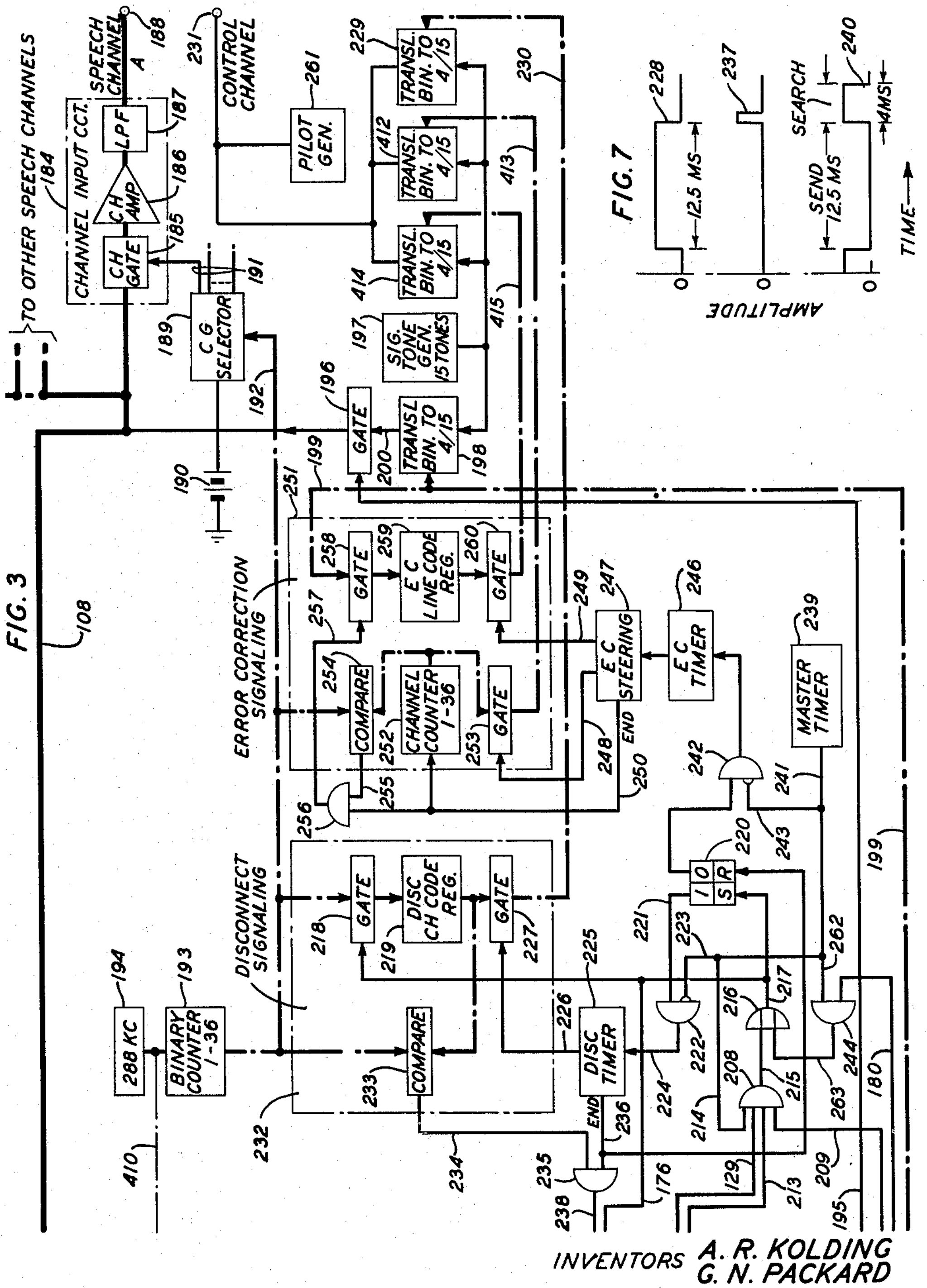

Proceeding to Fig. 3 of the drawings, there is provided a plurality of speech channel input circuits, such as channel input circuit 184. There is, in fact, one such speech channel input circuit for each of the thirty-six speech channels available in transmission facility 101. For convenience, however, only one of these speech channel input circuits has been illustrated in detail. Thus there is shown in channel input circuit 184 a channel gate 185, a channel amplifier 186 and a low-pass filter 187 connected in series between time-divided multiplex bus 108 and channel output terminal 188. Similar channel input apparatus is, of course, provided for each of the other thirty-five speech channels. A Channel Gate (CG) selector 189 serves to connect a voltage from battery 190 to thirty-six leads 191 in succession, under the control of binary codes appearing on control cable 192. The binary codes on cable 192 are derived from a binary counter 193 which serves to count in binary notation the output pulses of a two hundred and eighty-eight kilocycle pulse generator 194. Like counter 138, counter 193 counts in cycles, repeating each cycle immediately after the completion of the previous cycle. In contrast to counter 138, however, counter 193 counts only to the number thirty-six before recycling and hence requires only a six-digit output. This number, thirty-six, of course, corresponds to the thirty-six speech channels available in transmission facility 101.

CG selector 189, under the control of six-digit binary codes from counter 193, serves to operate the thirty-six channel gates such as channel gate 185 connected to the speech channels by sequentially connecting battery 190 to each of the output leads 191. Memory circuit 170 is synchronized by way of synchronization lead 410 with pulse generator 194 and hence with binary counter 193 in such a manner that the word positions corresponding to each channel are read out at the same time that counter 193 is generating the binary coded identification of that channel, hence operating the channel gate of that channel by way of CG selector 189.

*Connect signaling*

An output on lead 178 of status decoder 177 in Fig. 2 is applied by way of lead 195 to a connect signaling gate 196 in Fig. 3. The operation of gate 196 serves to convey connect signaling information over the transmission system in the following manner. A signal tone generator 197 provides on fifteen output leads fifteen separate tones all of which fall within the voice frequency range. For convenience, these fifteen tones may be subdivided into four subgroups, three of which include four tones and one of which includes three tones. Voice frequency signaling may be accomplished by representing the information to be transmitted by permutations in the appearance of these fifteen tones. Redundancy may be included in such codes by restricting these permutations so as to include only four tones, each one of which must be chosen from a different one of the four subgroups.

A translator 198 is provided to translate the binary codes appearing on cable 199 into this four-out-of-fifteen signaling code. The binary codes appearing on cable 199 are taken from the output cable 168 of line code memory 154. Thus, translator 198 serves to generate on its output lead 200 in succession a frequency coded representation of the binary coded talker identities stored in line code memory 154. A signal on lead 195 serves to gate these multifrequency codes to multiplex bus 108. Since memories 154 and 171 are synchronized with the operation of binary counter 193, these multifrequency codes are simultaneously gated by means of the appropriate channel gate such as channel gate 185 onto the speech channel corresponding to that word position in memories 154 and 171. Furthermore, since counter 193 recycles for each thirty-six output pulses from generator 194, each of these channel gates is operated at an eight kilocycle rate (288,000 divided by 36). Low-pass filters such as filter 187 serve to reconstruct continuous signaling tones by removing this eight kilocycle sampling frequency.

It can be seen that once a talker identity code is registered in line code memory 154, a connect signaling status C is registered in status memory 171 and a multifrequency code identifying that registered talker is transmitted over the transmission channel to which that talker has been assigned. Because of the narrow bandwidth which is available to each of the fifteen tones, these multifrequency connect signaling tones must be sustained for at least a minimum interval in order that they may be accurately identified at the receiver. The method for accomplishing this connect signal timing will now be described.

*Connect signal timing*

Included in memory circuit 170 is a connect timing memory 201 which is similar to line code memory 154 and status memory 171 in that it has a capacity of thirty-six words corresponding to the thirty-six transmission channels. Each of these words, however, is composed of only four digits or bits. These four bits are generated in a binary counter 202 which is driven by a two kilocycle pulse train which may be derived by way of frequency divider 411 from the two hundred and fifty-six kilocycle pulse generator 137. Binary counter 202 counts in binary notation from one to thirty-two and automatically recycles to repeat this same count.

A signal on lead 159 which accompanies the operation of gate 155 or 156 operates gate 203 and thereby serves to write one of the output codes from counter 202 in a particular time slot in connect timing memory 201. The code thus written does not depend upon any preselected plan but only upon the particular instant of the cycle of counter 202 at which a talker identity code is gated from queuing circuit 141 to line code memory 154. Thus, the connect timing code written into memory 201 may have any one of thirty-two different values depending only upon the time of assignment in line code memory 154.

The contents of memory 201 are scanned systematically and presented in succession to a compare circuit 204. The output of counter 202 is continuously applied to an add circuit 205 which serves to add, in binary notation, the number seven to any binary code appearing at its input. Thus, the output of add circuit 205 comprises the same series as that appearing at the output of counter 202 but advanced seven numbers. The output of add circuit 205 is applied to a second input of compare circuit 204.

Compare circuit 204 provides a digit-by-digit comparison between the binary code output of connect timing memory 201 and the binary code output of add circuit 205. When and only when these two inputs are identical, compare circuit 204 produces an output on lead 206. At all other times no signal will appear on lead 206.

It can be seen that a new binary code is generated by counter 202 once each half millisecond due to the two kilocycle driving rate. Connect timing memory 201, on the other hand, is being scanned at a rate corresponding to the operation of binary counter 193, that is, at an eight kilocycle rate. Thus the entire contents of connect timing memory 201 is scanned four times for each change in the output of counter 202. The number gated into connect timing memory 201 from counter 202 will not agree with the output of add circuit 205 until counter 202 has proceeded in its count to a number which is seven less than the number so gated, that is, thirty-two minus seven, or twenty-five. Since each count requires a half millisecond, this identity of counts will not occur until 12.5 milliseconds later. This type of timing circuit is described in greater detail in the copending application of G. N. Packard, Serial No. 704,927, filed December 24, 1957.

The signal on output lead 206 of compare circuit 204, occurring 12.5 milliseconds after the operation of gate 203, is introduced into an AND gate 207 to partially enable this gate. AND gate 207 is completely enabled by the simultaneous appearance of a signal on lead 178 indicating that this channel has been marked for connect signaling. The output of AND gate 207 is applied by way of lead 173 to status encoder 172 to change the status of this channel from C (connect signaling) to T (talking).

The T status code, upon being decoded in status decoder 177, provides an output on lead 179 which is applied by way of lead 123 to LG selector 118. Simultaneously, the identity code of the talker assigned to this channel is read out of line code memory 154 on cable 168 and applied to control cable 133 of LG selector 118. This talker identity code serves to connect lead 123 to the line gate of the identified talker's line equipment station. The signal on lead 123 serves to operate this line gate and connect the talker to multiplex bus 108. Simultaneously and in synchronism with the operation of this line gate, the appropriate channel gate is operated by the output of binary counter 193 through CG selector 189. Thus, a complete signal path is established between the talker input terminal, through multiplex bus 108, to the appropriate channel input terminal. This connection is maintained for only a brief interval and hence only an amplitude modulated pulse sample is delivered from the talker to the channel. Due to the recycling nature of memory 154 and counter 193, however, this sampling operation is repeated at an eight kilocycle rate. Low-pass filters, such as filter 187, in the channel input circuit serve to reconstruct the continuous speech signal by removing this eight kilocycle sampling rate.

From the above description it can be seen that the apparatus heretofore described serves to recognize each active talker as he becomes active, to assign each active talker to one of the available transmission channels, to transmit a multifrequency coded identification of the assigned talker's identity over the assigned channel for an interval of 12.5 milliseconds and then to transmit that talker's speech over the assigned channel. Due to the time division taking place on multiplex bus 108 and in memory 170, all of the talkers and transmission channels may be served simultaneously by placing the speech samples from each talker in successive time slots and repeating the sequence at an eight kilocycle rate. In this way speech is delivered from each active talker to the assigned one of the transmission channels. Since there are more talkers than there are transmission channels, means are also provided for disconnecting assigned but inactive talkers in order to make their channels available to newly active talkers. This disconnection circuitry will now be described.

*Disconnection*

As has already been described, common line equipment 117 includes TDNC scanner 121. Scanner 121 is controlled by talker identity codes on cable 136 obtained by scanning the contents of line code memory 154. Input leads 130 of scanner 121 are connected to the various idle output leads, such as lead 112, of the various speech detectors, such as speech detector 110, in the line equipment stations. Thus a signal will appear on output lead 129 at any instant that a talker whose identity code appears on cable 136 is idle, that is, not actively engaged in emitting speech. An output on lead 129 therefore indicates that that particular talker identified by the code on cable 136 does not at that instant need the channel to which he has been assigned.

Lead 129 is introduced in Fig. 3 into AND gate 208. A second input to AND gate 208 appearing on lead 209 is taken from output lead 179 of status decoder 177. A signal appearing on lead 209 indicates that the particular channel associated with that word position in memory 170 is being regularly connected to one of the talker input terminals in order to transmit speech, that is, the channel has been assigned. A coincidence of leads 129 and 209 indicates that the talker to whom the channel has been assigned is no longer actively emitting speech.

Available output lead 181 of status decoder 177, in addition to controlling the gating of talker identities into line code memory 154 by way of lead 158, is also introduced as a trigger into a binary counter 210. Counter 210 is similar to counters 138, 193 and 202 but counts only from one to eight in binary notation. Counter 210 has a reset input 211 which is derived from pulse generator 194. Reset input lead 211 carries pulses occurring at an eight kilocycle rate which may be derived by well-known means from two hundred and eighty-eight kilocycle pulse generator 194. Binary counter 210 serves to count the "available" output pulses on lead 181 for each scanning cycle of memory circuit 170. Once this count is made, counter 210 is reset by a pulse on lead 211.

The output of counter 210 is introduced into a count threshold detector 212. Detector 212 determines whether the binary code output of counter 210 is less than a preselected number *c* and produces an output pulse on lead 213 when this count is less than *c*. Detector 212 is relatively slow to respond to the output of counter 210 and hence does not produce an output on lead 213 unless the count of counter 210 remains below *c* for a substantial period, for example, several cycles of memory circuit 170. The output of threshold detector 212 which appears on lead 213 is introduced as a third input into AND gate 208.

Ignoring for the moment the fourth input lead 214 to AND gate 208, it can be seen that a coincidence of inputs on leads 129, 213 and 209 indicates (1) that a talker has been assigned to the particular channel associated with this time slot, (2) that this talker is not actively engaged in emitting speech, and (3) that the number of available channels has fallen below a preselected minimum *c*. Since it is desirable to always have a channel available for assignment to a newly active talker, it is necessary to disconnect inactive talkers from the channel before that channel is requested by the newly active talker. This is the purpose of counter 210 and the associated circuitry.

The number *c* may be taken at any value which is desired. It has been found sufficient, however, to keep only two channels available for assignment to newly active talkers. Thus, in a preferred embodiment *c* is equal to two. A signal on lead 213 indicates that there are less than two channels available and that it is therefore necessary to disconnect one of the assigned but inactive talkers. Coincident signals on leads 129 and 209 indicate that the talker assigned to this position in memory circuit 170 is assigned but is inactive.

Assuming for the moment that a signal simultaneously appears on lead 214, AND gate 208 is completely enabled and produces an output on lead 215. This output is introduced into OR gate 216 which produces an output on lead 217. The signal on lead 217 is introduced into disconnect signaling circuit 232 and serves to enable gate 218, transferring the binary code then appearing on the output of counter 193 into disconnect channel code register 219. Due to the synchronium between counter 193 and memory circuit 170, this binary code identifies the particular channel to be disconnected. The output of OR gate 216 appearing on lead 217 simultaneously sets a bistable device 220 to produce an output on lead 221. Assuming for the moment that gate 222 is not inhibited by a signal on lead 223, this output on lead 221 is introduced into disconnect timer 225 by way of lead 224. Disconnect timer 225 is a monostable timing device such as a monostable multivibrator having a timing period of approximately 12.5 milliseconds. During this interval, an output appears on lead 226 to operate gate 227. The output of disconnect timer 225 appearing on lead 226 is illustrated as waveform 228 in Fig. 7. A timing circuit suitable for this purpose is disclosed in the copending application of E. Cohen, Serial No. 753,822, filed August 7, 1958.

Gate 227 transfers the contents of disconnect channel code register 219 to a translating circuit 229 by way of cable 230. Translating circuit 229 is similar to translator 198 in that it translates the binary code appearing on input cable 230 into a four-out-of-fifteen code which gates four of the fifteen output tones from signal tone generator 197. These coded tones are connected to a control channel input terminal 231. The control channel connected to terminal 231 parallels the speech channels of transmission facility 101 and may, indeed, be afforded by transmission facility 101 itself. This control channel is capable of carrying the four-out-of-fifteen multifrequency coded tone bursts provided by translator 229. Since all of these tones are in the voice frequency band, the control channel may merely comprise a thirty-seventh speech channel.

Returning to disconnect circuit 232, the output of disconnect channel register 219 is simultaneously introduced into a compare circuit 233 similar to compare circuit 204. Also introduced into compare circuit 233 is the output of binary counter 193. Compare circuit 233 provides a digit-by-digit comparison between the binary codes appearing on its two input terminals and, when these codes are identical, produces an output on lead 234. The output on lead 234 is introduced into AND gate 235.

Disconnect timer 225, in addition to producing timing wave 228 on output lead 226, also produces a pulse on lead 236 at the end of the timing interval. This pulse, illustrated as waveform 237 in Fig. 7, is also introduced into AND gate 235. Simultaneous inputs to AND gate 235 appearing on leads 234 and 236 serve to produce an output on lead 238. The signal on lead 238, signifying the completion of the disconnect signal transmission interval, is introduced into status encoder 172 by way of lead 175 and serves to write an available status code ("00") into status memory 171. Simultaneously, the signal on lead 238 is applied by way of lead 169 to line code memory 154 to erase the contents of line code memory 154 in that particular time slot.

Returning to Fig. 3, the output of OR gate 216, appearing on lead 217, not only enables gate 218 and sets bistable device 220 but also is applied by way of lead 176 to status encoder 172. This signal serves to write a disconnect status code ("10") in status memory 171 in the time slot assigned to the channel to be disconnected. In this way, the memory circuits 170 cease to treat the talker assigned to that channel as an active talker and no longer connect him to a speech channel.

It will be noted that, while only a single talker at a time may be disconnected by means of the disconnect signaling circuit 232, more than one talker may simultaneously require disconnection. Each talker requiring disconnection, that is, assigned but inactive, will operate gate 218 to write the appropriate channel code into disconnect channel code register 219. Simultaneously, each talker requiring disconnection will have his status code changed to "10" to mark that channel for disconnection in the memory circuits. Only the last channel code gated into register 219 will be actually disconnected, however. This is accomplished as described by means of disconnect timer 225, gate 227 and translator 229.

The disconnect status code, appearing in status memory 171 for all of the talkers to be disconnected, is decoded in status decoder 177 and an output appears on lead 180 for each cycle of memory circuit 170. Lead 180 is introduced into AND gate 244 to which there is also applied a signal on lead 262 identical to that appearing on lead 214. Assuming that a signal is present on lead 262, AND gate 244 is fully enabled and produces an output on lead 263. Lead 263 is introduced into OR gate 216 and serves to initiate a disconnect cycle in the same manner as a signal on lead 215.

On the completion of a disconnect cycle, one of the disconnect codes is changed to an available code by way of lead 238 as described above. Simultaneously, bistable device 220 is reset by the signal on lead 236 indicating the end of the disconnection timing interval. The circuit is now ready for another disconnect cycle which may be initiated by a signal on lead 180 indicating that a channel has already been marked for disconnection. In this way, disconnect circuit 232 can handle any number of disconnections in succession and may, indeed, consecutively disconnect all of the assigned channels to make room for a large number of newly active talkers.

It can be seen that the above-described arrangements attempt to maintain at least two channels available for assignment by disconnecting assigned but inactive talkers. It is apparent, however, that these two channels will not be made available if all of the assigned talkers are actively engaged in emitting speech. Under this condition, a newly active talker will not be assigned a channel and his talk-spurt will be "frozen out" and lost to the intended listener. Such freeze-outs are undesirable in a high quality speech transmission system. In a well designed TASI system, however, the statistical probability of a freeze-out of significant length is sufficiently remote so as to cause only negligible degradation of the speech signals of very few of the talkers. This probability of freeze-out is, as would be expected, determined by the ratio of talkers to channels. By appropriate adjustments of this ratio, the best compromise between speech degradation due to freeze-out and transmission economies due to speech interpolation can be made.

It will be noted that the effective operation of the time assignment speech interpolation system as heretofore described depends to a large extent upon the accuracy of the transmission and reception of frequency coded identity signals. Thus, the connect signals, transmitted over the speech channels to indicate the intended destination of the speech samples to follow, will not serve their function if they are lost or mutilated during transmission. Similarly, a disconnect signal, transmitted over the control channel to indicate that a particular channel is to be disconnected, will not perform its function if it is not accurately received. Since transmission systems are normally subject to failures, interference and noise, it is necessary to safeguard against the possibility that any one or more of these frequency coded signals will be lost or mutilated. In either event, speech will not be directed to its intended destination and the communication path will be degraded to that extent.

Since the TASI system heretofore described if of the "seize and hold" type, any loss or transposition of one of these multifrequency codes will cause an error in the functioning of the system which may persist for a considerable period. Thus, a connect signal which is improperly received will result in the connection of a talker to the wrong listener until the talker is disconnected by the random operation of the disconnect circuit and is reconnected when he again becomes active, or until he hangs up and thus terminates his call. This may result in the loss of entire passages of speech and prevent any effective communication between the talker and the listener.

*Error correction*

In accordance with the present invention, means are provided to systematically check the accurate reception of these multifrequency codes and to make corrections where necessary. Thus, there is shown in Fig. 3 a master timer 239 which may comprise any bistable device which produces a square wave output of the form illustrated schematically as waveform 240 in Fig. 7. The output of master timer 239, appearing on lead 241, has a first value, for example, a positive voltage, for a portion of the time and a second condition, for example, zero voltage, for the remainder of the time. These two conditions occur alternately and may conveniently be termed "search" and "send" intervals, as illustrated in Fig. 7. During the search interval, master timer 239 produces an output on lead 241 which serves to complete the enablement of AND gates 208 and 244. Simultaneously, this output inhibits gate 222 by way of lead 223 and inhibits gate 242 by way of lead 243. During the send interval, the absence of a signal on lead 241 serves to disable AND gates 208 and 244 and to enable gates 222 and 242.

As was described above, the simultaneous appearance of signals on leads 229, 213 and 209 enable AND gate 208 to set bistable device 220 and initiate a disconnect timing cycle. Since the output of master timer 239 is also applied to AND gate 208, this disconnect cycle can be initiated only during the search interval. At the termination of the disconnect interval, bistable device 220 is reset by the pulse appearing on lead 236 indicating the end of the timing cycle. If the following search interval indicates that further disconnections are not required, bistable device 220 remains in a reset condition, producing an output on lead 245.

During the following send interval, gate 242 is no longer disabled and the signal on lead 245 initiates a timing cycle in error correction timer 246. Error correction timer 246 is similar to disconnect timer 225 and produces an output pulse of approximately 12.5 millisecond duration once it is triggered by an input from lead 245. This pulse is introduced into an error correction steering circuit 247 which serves to apply this timing pulse alternately to two output leads 248 and 249. Leads 248 and 249 are introduced into an error correction circuit 251. Upon the termination of a timing pulse on output lead 249, steering circuit 247 produces an end of cycle pulse on lead 250.

Proceeding to a detailed description of error correction circuit 251, there is shown a channel counter 252 which serves to count in binary notation from one to thirty-six when advanced by successive trigger inputs on lead 250. The binary number appearing on the output of counter 252 is simultaneously introduced into a gate circuit 253 and a compare circuit 254. A signal on output lead 248 of steering circuit 247 enables gate 253 to transfer the binary code output of counter 252 to translating circuit 412 by way of cable 413. Translator 412 is similar to translator 229 but produces a group of distinctive four-out-of-fifteen codes. Thus, a binary code representative of a particular channel is translated into a multifrequency code and transmitted over the control channel in the same manner as the disconnect signals previously described.

The output of binary counter 193 is introduced into the other input of compare circuit 254. Compare circuit 254 makes a digit-by-digit comparison between the code output of counter 252 and the code output of counter 193. When these two binary codes are identical, an output is produced on lead 255 and introduced into AND gate 256. Since counter 193 is recycling at an eight kilocycle rate, these codes will become identical within one hundred and twenty-five microseconds and will be identical once each one hundred and twenty-five microseconds thereafter. The other input to AND gate 256 is obtained from output lead 250 of steering circuit 247. A signal on this lead indicates that the sending interval for the channel identity code produced by counter 252 has terminated. Simultaneous signals on leads 250 and 255 enable AND gate 256 to produce an output on lead 257 in the time slot during which counter 193 is generating the channel code which has just been transmitted. The signal on lead 257 enables gate 258 to transfer the talker identity code on cable 199 into error correction line code register 259. The line code which appears on cable 199 at this time is the talker identity which has been assigned in memory 154 to the channel whose code has just been transmitted. On the next error correction sending cycle, steering circuit 247 produces an output on lead 249 rather than lead 248, thus enabling gate 260 and transferring this line code to translation circuit 414 by way of cable 415. Translator 414 translates the binary line codes into unique four-out-of-fifteen multifrequency codes and transmits these codes over the control channel.

From the above description, it can be seen that the error correction circuit 251, together with the timing circuits, serve to alternately transmit channel identity codes and talker identity codes, each channel identity code being followed by the talker identity code assigned to that channel in line code memory 154. Thus, the error correction signals comprise a series of pairs of identity codes, each pair comprising a channel code and the assigned talker identity code. Counter 252 proceeds systematically through all of the channels in succession beginning with number one and continuing through number thirty-six. Once such a cycle is complete, error correction circuit 251 repeats this cycle beginning again with channel number one and its assigned talker's identity code. Since each signaling interval takes up about fifteen milliseconds, the roll call of the entire contents of line code memory 154 can be transmitted in about one second. Thus, most errors which have occurred in the transmission of the connect and disconnect signaling codes will have been corrected within one second.

It will be noted that the code appearing in line code memory 154 for each unassigned channel consists of seven zeros since no code has been written into memory 154. This code has not been assigned to any talker and is used instead as an indication that the channel is not assigned. This code ("0000000") will be read out of line code memory 154 by the error correction circuit in the same manner as a talker identity code. Receipt of this code at the receiver, however, will indicate that no listener should be assigned to this particular channel and, if necessary, will permit the necessary corrections to obtain this result. Thus it is seen that the error correction system will make corrections not only in erroneously received connect signals but also in erroneously received or lost disconnect signals.

Further, it can be seen that master timing circuit 239 and the associated gate circuitry serve to give disconnect signaling priority on each signaling cycle. That is, after each send interval, master timer 239 forces the signaling circuits to search for an idle assigned talker to disconnect if such disconnection is necessary to maintain channels available for assignment. Error correction signaling is permitted only if disconnect signaling is found not to be required. If a large number of rapidly speaking talkers are connected to the TASI system, a large number of disconnect operations will be required to continually make channels available for the talkers as they become active. During such intervals, a large proportion of the signaling time will be devoted to disconnect signaling and relatively little will be left for error correction. Since connections are changing quite rapidly during such intervals, however, error correction information is not as important. For example, since the correction of an error may take as long as one second, it is possible that a talker will be disconnected before the error correction circuit can correct any errors that exist. Thus, during periods of high activity, the TASI system is self-correcting in that the activity itself forces rapid disconnection and re-establishment of connections. Any error occurring during a period of high activity will therefore exist only for a short period.

During periods of low activity, however, each talker will retain his connection for relatively long periods of time since these speech channels will not be required for other talkers. It is during these periods of low activity that errors could result in erroneous connections continuing for long periods. During such periods of low activity, however, the disconnection rate is also low and hence a large proportion of the signaling time may be devoted to error-correction signaling. Indeed, if the number of talkers is less than the number of channels, each talker will retain his initially assigned channel for the entire duration of his conversation and no disconnections whatsoever will be required. All of the signaling time will then be devoted to error-correction signaling and any errors which occur will be corrected within one second or less. Thus, the single control channel, by dividing its time between disconnect signaling and error-correction signaling in proportion to the requirements of each, will insure that errors which occur result in erroneous connections that can continue for only very brief periods.

A pilot signal generator 261 is connected to control channel input terminal 231 and provides a pilot signal differing from all of the signal tones. This pilot signal may be used in accordance with practices well known in the signaling art to monitor the operation of the control channel and to provide an alarm upon the disruption of the transmission path through the control channel. The means by which this is accomplished will be more fully described hereafter.

Having described the time assignment speech interpolation transmitter, the receiving circuit of this system will next be described. It will be noted first, however, that all of the control signals are generated at the transmitter, transmitted to the receiver, and utilized at the receiver to duplicate the connections made at the transmitter. In this sense the TASI receiver is merely a slave of the TASI transmitter, making no primary decisions by itself but merely following the coded supervisory instructions given to it by the transmitter. With this in mind, a detailed description of the TASI receiver will now be given.

*TASI receiver*

Figure 4:
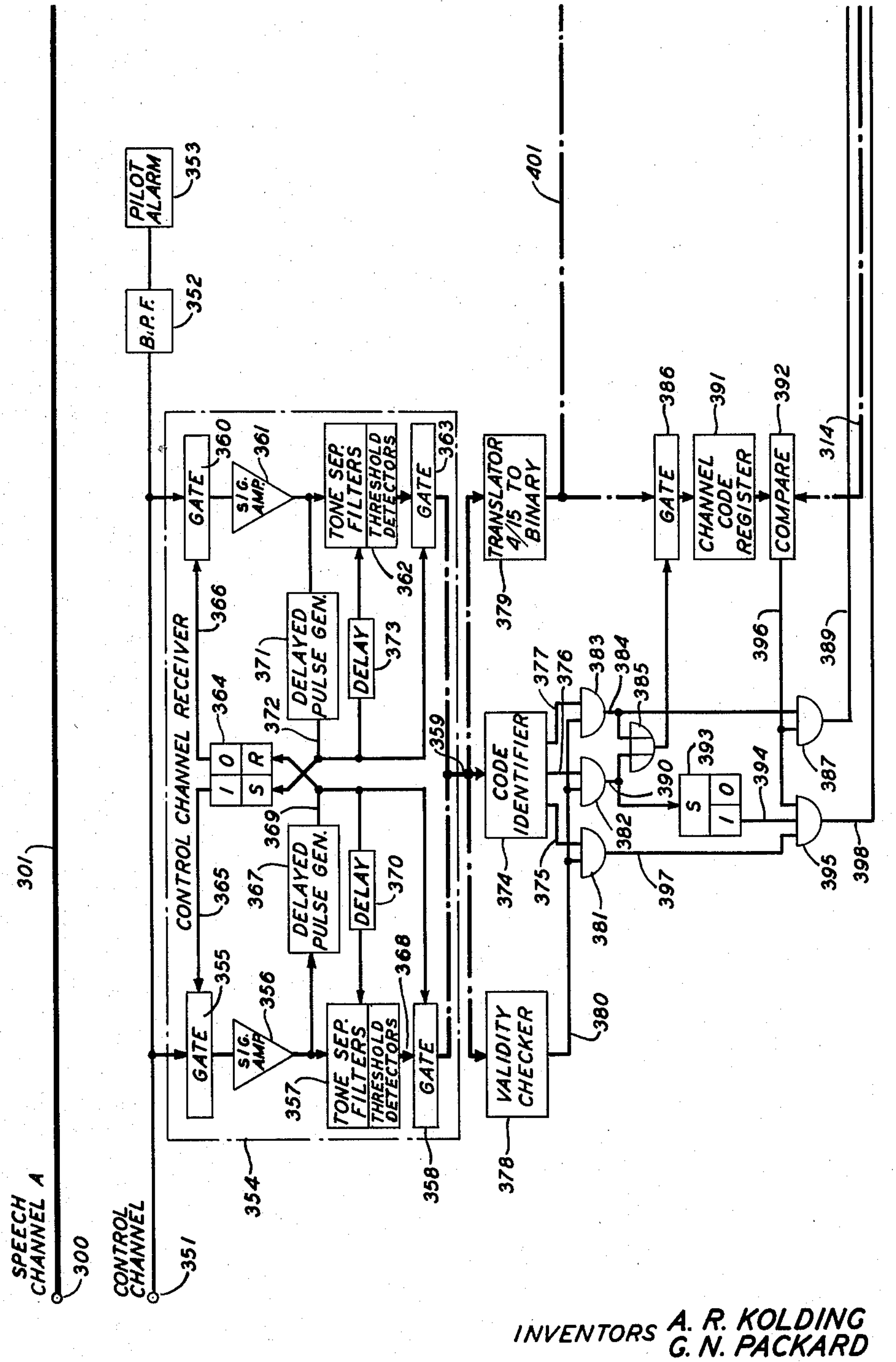
Figure 5:
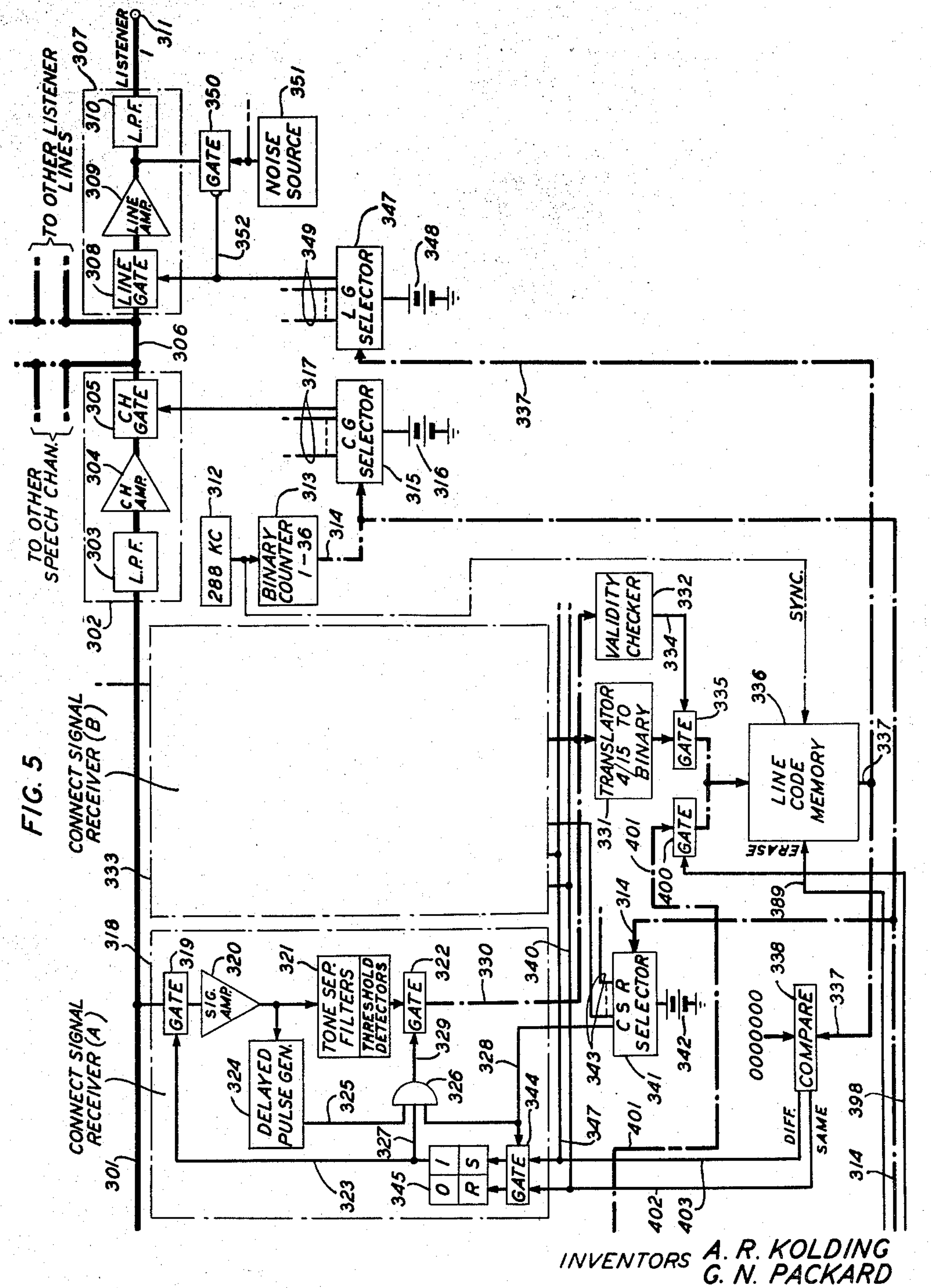

In Fig. 4 of the drawings there is shown a channel output terminal 300 which is connected by way of lead 301 to a channel output circuit 302 in Fig. 5. Channel output circuit 302 is similar to line equipment station 104 in the TASI transmitter and comprises a low-pass filter 303, a channel amplifier 304 and a channel gate 305 connected in series between terminal 300 and multiplex bus 306. As in the case of the TASI transmitter, low-pass filter 303 serves to limit signals received on the speech channel to the voice frequency range, amplifier 304 serves to raise the levels of these speech signals to an appropriate level and channel gate 305 forms the input portion of a time division switching arrangement. There are, of course, thirty-six speech channels and each of these speech channels is connected by way of a terminal similar to terminal 300 to a channel output circuit similar to circuit 302. The equipment for only one of the channels, channel A, has been illustrated in detail.

Channel output circuit 302 is connected to time division multiplex bus 306 similar to bus 108 in the TASI transmitter. Connected to multiplex bus 306 is a listener station 307 similar to channel input circuit 184 in the TASI transmitter and comprising a line gate 308, a line amplifier 309 and a low-pass filter 310. Elements 308, 309 and 310 are similar in structure and in function to elements 185, 186 and 187 in the TASI transmitter. That is, like line gate 308 forms the output portion of a time division switching arrangement, amplifier 309 raises the level of the signal provided at its input and filter 310 removes the sampling frequency introduced by the time division gates. Listener circuit 307 is connected to terminal 311 which forms the output terminal of the TASI system and to which a telephone subscriber may be connected. There are provided, of course, one hundred and twenty listener circuits similar to circuit 307 each connected to one of one hundred and twenty listener terminals such as terminal 311. Only one of these circuits has been illustrated for the purpose of convenience.

In order to complete the connection between the talkers at the transmitting terminal and the listeners at the receiving terminal, it is necessary to secure at the TASI receiver the operation of the channel and line gates, such as gates 305 and 308, at the proper times. The remainder of the circuitry at the receiving terminal is directed to this end.

*Switching circuits*

A pulse generator 312 (Fig. 5) is provided in the TASI receiver to generate a series of pulses having a repetition rate of two hundred eighty-eight thousand pulses per second. Pulse generator 312 may be identical to pulse generator 194 in the TASI receiver. It is important to note, however, that generator 312 is not in any sense synchronized with pulse generator 194. Thus, no pulse synchronizing information need be transmitted between the transmitting terminal and the receiving terminal.

Pulse generator 312 drives a binary counter 313 which may be identical to binary counter 193 in the TASI transmitter. Counter 313 generates in sequence the binary numbers one through thirty-six and then recycles and resumes its count at one.

The six digit output of counter 313 is applied by way of cable 314 to Channel Gate selector 315. CG selector 315 may be identical to CG selector 189 in the TASI transmitting terminal. That is, circuit 315 serves to connect a battery 316 to any one out of thirty-six output leads 317 under the control of the six-digit binary numbers appearing on cable 314. Since these binary numbers extend from one to thirty-six and appear in rotation, channel gate selector 315 serves to connect battery 316 to each of output leads 317 in rotation. Each of the output leads 317 is connected to the channel gate of one of the channel output circuits connected to the thirty-six speech channels. In this way, each of the speech channels is connected to multiplex bus 306 for a brief interval and this connection is repeated at an eight kilocycle rate. In order to route the signal samples generated by these channel gates to the proper listeners, it is only necessary to operate the appropriate line gates such as gate 308 simultaneously with the operation of the channel gates. The means for accomplishing this will now be described.

*Connect signal reception*

It will be recalled that the TASI transmitter previously described transmits a four-out-of-fifteen multifrequency connect signaling code over a speech channel just prior to the transmission of a talkspurt. A connect signal receiver such as receiver 318, is therefore provided to detect these connect signaling codes on each speech channel. Connect signal receiver 318 includes a gate 319, a signal amplifier 320, a bank 321 of fifteen tone separation filters and threshold detectors and a gate 322 connected in series. Gate 319 is connected to speech channel A, represented by lead 301. Similarly, connect signal receiver 333 is connected to speech channel B and other connect signal receivers, not shown, are connected to the remaining speech channels.

Assuming for the moment that gate 319 has been enabled by a signal on lead 323, multifrequency connect signals transmitted by speech channel A are delivered from lead 301 through gate 319 to a signal amplifier 320. Here these signals are amplified to bring their level up to the value necessary for the energization of the threshold detectors in bank 321.

Bank 321 comprises fifteen bandpass filters connected in parallel, each followed by a threshold detector. The mid-band frequencies of these bandpass filters correspond to the signal frequencies generated in signal tone generator 197 of the TASI transmitter. Thus, a signal is produced at the output of a threshold detector only if the signaling tone corresponding to the mid-band frequency of the connected filter is present on speech channel connected to lead 301.

Simultaneously with their application to bank 321, these multifrequency tones are applied to a delayed pulse generator 324 which detects the leading edge of the connect signal tone burst and generates a pulse approximately ten milliseconds thereafter. Such a delayed pulse generator may comprise, for example, a monostable multivibrator, triggered by a threshold device, whose output is differentiated to produce the delayed pulse. This pulse is applied by way of lead 325 to AND gate 326. Assuming for the moment that AND gate 326 is fully enabled by the simultaneous appearance of signals on leads 327 and 328, an output is produced on lead 329 which enables gates 322. The outputs of the threshold detectors in bank 321, comprising fifteen parallel leads, are applied by way of gate 322 and cable 330 to translator 331. Translator 331 performs the function which is inverse to that performed by translator 198 in the transmitting terminal. That is, translator 321 utilizes the signals on four out of the fifteen input terminals to generate a seven-digit binary code. This seven-digit code, of course, corresponds to the code from which the four-out-of-fifteen signaling code was originally derived and identifies the particular talker whose speech spurt will immediately follow on speech channel A.

The outputs of the threshold detectors in bank 321 are simultaneously applied by way of gate 322 and cable 330 to a validity checking circuit 332. Circuit 332 serves to determine whether the four-out-of-fifteen code received by connect signal receiver 318 is a valid code as determined by the coding rules built into translator 198 at the transmitting terminal. That is, validity checker 332 determines whether or not one and only one signaling tone is present in each of four subgroups corresponding to the subgrouping of the translator 198. If the received code is not a valid code, the circuits ignore the code and proceed as before. If the code is valid, an output is produced on lead 334 which serves to operate gate 335 and transfer the code from translating circuit 331 to a line code memory 336.

*Assignment*

Line code memory 336 may be identical to line code memory 154 in the TASI transmitter. Memory 336 has a capacity of thirty-six words of seven bits each. These words are read out on cable 337 in regular sequence at an eight kilocycle repetition rate. Furthermore, line code memory 336 is synchronized with pulse generator 312 such that a word is read out of memory 336 simultaneously with the generation of each binary code output of counter 313. These words may be termed listener identity codes for convenience, each talker-listener pair sharing the same code.

The output of line code memory 336 appearing on cable 337 is applied to a compare circuit 338 which serves to compare the listener identity line codes stored in memory 336 with the fixed code "0000000." This latter code indicates at the receiver, as at the transmitter, that the channel associated with that code in the memory unit 336 has not been assigned to a listener. An output from compare circuit 338, appearing on lead 402 when these two inputs are identical, indicates that that word position in memory 336 has not as yet been assigned a listener identity code. Similarly, an output on lead 403 indicates that the two inputs are not identical and that that word position has been assigned. The outputs of compare circuit 338 appearing on leads 402 and 403 are applied to buses 340 and 347, respectively.

The output of binary counter 313 is applied by way of cable 314 to the control input of Connect Signal Receiver selector 341. Selector 341 is similar to selector 315 and serves to selectively connect battery 342 to output leads 343 under the control of the binary numbers appearing on cable 314. Since the thirty-six channel codes appear in succession on cable 314, selector 341 energizes output leads 343 in rotation. Each of output leads 343 is introduced into one of the thirty-six connect signal receivers, such as receiver 318, to enable a gate, such as gate 344, and is simultaneously applied to an AND gate such as AND gate 326. The signal on lead 328 enables gate 344 and serves to apply the signal then appearing on bus 340 to the set input, and on bus 347 to the reset input, of a bistable device 345. When bistable device 345 is set in this way, an output is produced on lead 323 which serves to complete the enablement of AND gate 326 and to enable gate 319.

From the above description it can be seen that the presence of an unassigned position in line code memory 336 is recognized by compare circuit 338 and utilized by way of bus 340, gate 344 and bistable device 345 to enable gate 319 and thus permit connect signal receiver 318 to receive multifrequency connect signaling tones. Similar apparatus is, of course, provided for each of the other connect signaling receivers (such as connect signal receiver 333 provided for speech channel B).

If the channel has been assigned to a listener in memory 336, compare circuit 338 produces an output on lead 403 which is applied to bus 347. Gate 344 is simultaneously operated by CSR selector 341 and this signal on bus 347 is applied to the reset input of bistable device 345, removing the output from lead 323. Gate 319 is thus disabled and the connect signal receiver 318 is no longer connected to the speech channel.

In this way, each of the connect signal receivers is connected to the appropriate speech channel when a signal appears on bus 340, indicating that this channel has the all-zeros code in memory 336. When a line code replaces the all-zeros code, a signal appears on bus 347 to disconnect the connect signal receiver from its channel. CSR selector 341 serves to apply these control signals to the appropriate connect signal receivers in synchronism with the scan of memory 336. At the same time, selector 341 serves to complete the enablement of the AND gates, such as AND gate 326, to transfer the four-out-of-fifteen connect signals into translator 331.

The output of line code memory 336 is applied by way of cable 337 to Line Gate selector 347 which is similar to Line Gate selector 118 in the TASI transmitter. That is, LG selector 347 serves to selectively connect battery 348 to the output leads 349 under the control of binary codes appearing on cable 337. Output leads 349 are connected to the various line gates such as line gate 308 of the listener output circuits such as circuit 307. Due to the synchronism between binary counter 313 and line code memory 336, selectors 315 and 347 serve to simultaneously enable a channel gate and the line gate of the assigned listener for each of the speech channels. Furthermore, these gating operations are repeated in cycles at an eight kilocycle rate due to the recycling of counter 313. The speech samples, delivered by way of a channel gate such as channel gate 305, multiplex bus 306, and a line gate such as line gate 308, are amplified by means of an amplifier such as line amplifier 309 and applied to a low-pass filter such as filter 310. This low-pass filter serves to remove the sampling frequencies and thus delivers at its output a continuous speech wave substantially identical to the speech wave introduced at the corresponding input terminal of the TASI transmitter.

Each of output leads 349 of LG selector 347 is applied to a normally enabled gate such as gate 350. Gate 350 serves to connect, when enabled, a noise source 351 to the input of low-pass filter 310. Gate 350 may be disabled by a signal on lead 352. This disabling means has a certain amount of hangover such that gate 350 remains disabled for a fixed interval after the signal is removed from lead 352. This interval is at least sufficiently long to bridge over between successive operations of gate 350 when operated at an eight kilocycle rate.

If the listener connected to terminal 311 has not been assigned to a channel in line code memory 336, his code will not appear on lead 337, his line gate 308 will not be enabled by an output from selector 347 and the listener will be effectively disconnected from the transmission system. Since transmission systems normally produce at least some background noise, the removal of this listener from the transmission system will leave the listener with the impression that he no longer is receiving service. Furthermore, the switching of the listener on and off of the long transmission circuit produces a marked contrast in noise, thus emphasizing the switching. Under this condition, however, gate 350 remains disabled and a certain amount of noise is inserted in the listening path of this listener. This noise gives the listener some assurance that he is still receiving service, masks the switching, and increases the realism of his telephone conversation. When speech is being delivered to this listener, gate 350 is disabled by signals on lead 352 and remains disabled for the entire interval of the talkspurt due to the hangover built into gate 350. In this way, locally generated noise can be used to mask the disconnections which each talker must necessarily endure to allow the most complete utilization of the transmission facilities.

The means necessary for completing the connection between a talker and the corresponding listener have now been described. It can be seen that this connection is made by scanning the talkers at the transmitter, determining when each talker becomes active and assigning active talkers to available transmission channels. By means of supervisory signaling tones, these assignments are transmitted to the receiver and utilized to set up corresponding assignments of transmission channels to listeners at the receiver. It is also necessary, however, that these talkers be disconnected when the transmission channel is required for reassignment to a newly active talker. It is desirable that these assignments be checked for accuracy regularly throughout the operation of the TASI system. The means for initiating disconnection and error checking information at the TASI transmitter has already been described. The means by which this information is utilized at the TASI receiver will now be described.

*Control signal reception*

In Fig. 4 there is shown a terminal 351 which is connected to the receiving end of the control channel. Connected to terminal 351 is a bandpass filter 352 and a pilot alarm circuit 353. Filter 352 passes only the signal from pilot signal generator 261 in the TASI transmitter. Alarm circuit 353 detects this pilot signal when present and operates a suitable audible or visual alarm when the pilot signal is no longer received. This pilot alarm circuit 353 therefore serves to monitor the transmission continuity of the control channel and to provide an indication of failures. Rather than operating a sensory alarm, circuit 353 may, of course, automatically remove the TASI system from service or automatically substitute a standby control channel.

Also connected to terminal 351 is a control channel receiver 354. In general, receiver 354 serves to receive and detect the multifrequency disconnect and error-correction codes transmitted over the control channel. In order to increase the speed of response and accuracy of the signal-receiving equipment, two separate receiving paths are provided. A first path, comprising input gate 355, signal amplifier 356, tone separation filter and threshold detector bank 357 and output gate 358, is connected between terminal 351 and output cable 359. Similarly, a second receiving path, comprising input gate 360, signal amplifier 361, tone separation filter and threshold detector bank 362 and output gate 363, is also connected between terminal 351 and output cable 359.

A bistable device 364 is utilized to insure that these two receiving paths are used alternately. A signal on output lead 365 of bistable device 364 enables input gate 355 and connects the first receiving path to the control channel terminal. Similarly, a signal on output lead 366 of bistable device 364 enables input gate 360 to connect the second receiving path to terminal 351. Since device 364 is bistable, a signal can appear on only one of its two output leads 365 and 366 at a time.

Multifrequency coded signals passed by gate 355 are amplified to an appropriate level by signal amplifier 356 and simultaneously applied to a bank 357 of fifteen tone separation filters and associated threshold detectors and a delayed pulse generator 367. Bank 357 translates the multifrequency code into direct current signals appearing on four out of fifteen output leads, shown schematically as cable 368. Delayed pulse generator 367, which is similar to delayed pulse generator 324 in connect signal receiver 318, detects the presence of a multifrequency code and generates a pulse a predetermined interval after being triggered. This interval may, for example, be ten milliseconds, at which time this delayed pulse is applied by way of lead 369 to reset bistable device 364 and thus produce a signal on output lead 366 and remove the signal from output lead 365. In this way the first receiving path is removed from the control channel and the second path connected thereto.

Simultaneously with the resetting of bistable device 364, the delayed pulse on lead 369 is applied to gate 358 to enable this gate and transfer the four-out-of-fifteen code on cable 368 to output cable 359. This same pulse on lead 369, afteer a short delay in delay circuit 370, is applied to the bank 357 in order to discharge the storage elements of the filters and thus prepare them for the reception of a new multifrequency code.

Since control channel receiver 354 is symmetrical in all respects, the second receiving path operates in much the same way. When gate 360 is enabled by a signal on lead 366, the next multifrequency code to appear is applied to signal amplifier 361, the output of which is simultaneously applied to tone separation filter and threshold detector bank 362 and a delay pulse generator 371, similar to delay pulse generator 367. After a suitable interval, a pulse is produced on the output lead 372 of generator 371 to set bistable device 364, enable gate 363 and, after a suitable delay in delay circuit 373, discharge the storage elements in the filters of bank 362. From the above description it can be seen that the two receiving paths operate alternately to detect the multifrequency codes and to translate these frequency coded signals into permutation code groups on four out of fifteen parallel conductors in output cable 359.

It will be recalled that the multifrequency codes introduced on the control channel can represent any one of three different classes of data. These multifrequency codes can identify a channel which is to be disconnected or can represent a talker or a channel in the error-correction roll call. Before proceeding further, it must be determined into which of these three classes the received signal falls. To this end the four-out-of-fifteen codes appearing in parallel on cable 359 are applied to a code identifying circuit 374. Circuit 374 operates to determine which of the three classes the received signal belongs. This distinction can be made on the basis of some particular unique characteristic of each of the classes. Such characteristics may comprise, for example, a systematic appearance of certain digit combinations common only to the members of each class. Thus, one of the four subgroups may be reserved for marker tones. The particular tone out of this subgroup which is included in the multifrequency code will then determine which of the three possible classes of data is being transmitted. Code identifying circuit 374 would then merely determine which tone of this subgroup was present and operate AND gates 381, 382 and 383 accordingly. Code identifying circuit 374 produces an output on one of three output leads 375, 376 or 377 depending on the class into which the input signal falls. These classes correspond, of course, to the three translators 229, 412 and 414 in the TASI transmitter. Thus, a signal on lead 375 indicates that a talker identity code in the error-correction roll call has been received. A signal on lead 376 indicates that a channel code in the error-correction roll call has been received, and a signal on lead 377 indicates that a disconnection code has been received. For the purposes of convenience the disconnect circuitry will first be described.

*Disconnection*

The four-out-of-fifteen codes appearing on cable 359 are simultaneously applied to validity checking circuit 378 and translator 379, as well as code identifying circuit 374. Validity checking circuit 378 serves to determine whether or not the received code is valid, that is, includes all of the redundant characteristics incorporated by the translating circuit 229 in the TASI transmitter. If the code is found to be valid, a signal is produced on output lead 380 which is applied simultaneously to three AND gates 381, 382 and 383.

If a valid disconnect code has been received, AND gate 383 will be fully enabled by the simultaneous appearance of signals on leads 377 and 380. An output will then be produced on lead 384 which is applied simultaneously to an OR gate 385 and an AND gate 387. OR gate 385 will immediately produce an output to enable gate 386.

Translator 379 is similar to translator 331 and serves to perform the function inverse to that performed by translator 229 in the TASI transmitter. That is, translator 379 translates the four-out-of-fifteen code appearing on cable 359 into the binary code corresponding to the channel to be disconnected. This binary code is applied by way of gate 386 to channel code register 391. The output of register 391 is applied to a first input of compare circuit 392. A second input to compare circuit 392 is obtained from output cable 314 of binary counter 313. Since counter 313 is generating all of the possible channel identity codes in rotation at an eight kilocycle rate, the two inputs to compare circuit 392 will be identical at some number in the cycle. At the precise instant at which these codes are identical, an output is produced on lead 396 and applied to AND gate 387. The simultaneous appearance of signals on leads 384 and 396 fully enable AND gate 387, producing an output on lead 389. This output on lead 389 is applied to line code memory 336 in Fig. 4 to erase the listener identity code stored in the memory for the identified channel. In this way the listener is effectively disconnected since his listener identity code is no longer available to operate his line gate by way of cable 337 and LG selector 347. Replacing the line identity code in memory 336 there is now the all-zeros code.

*Error correction*

Returning to Fig. 4, an output on lead 376 of code identifying circuit 374 indicates that a channel code in the error-correction roll call has been received. The simultaneous appearance of a signal on lead 376 and lead 380 enables AND gate 382 to produce an output on lead 390. This output is also applied by way of OR gate 385 to gate 386. When gate 386 is enabled in this way, the channel identity binary code appearing at the output of translator 379 is transferred into channel code register 391 as before. This code is also stored in register 391 and applied to compare circuit 392.

The output of AND gate 382 is also applied to a monostable device 393 and serves to trigger device 393 into the "1" condition, producing an output on lead 394. This output is applied to an AND gate 395. Also applied to AND gate 395 is the output of compare circuit 392 appearing on lead 396. Device 393 is constructed so as to maintain an output on lead 394 for a predetermined interval after the triggering signal has been removed from lead 390. This interval may, for example, be on the order of thirty milliseconds. The purpose of this arrangement will be described hereinafter.

The reception of a line code in the error-correction roll call is indicated by an output on lead 375 from code identifying circuit 374. A valid line code produces simultaneous signals on leads 375 and 380 to fully enable AND gate 381 and produce an output on lead 397. This output is also applied to AND gate 395. When AND gate 395 is fully enabled by simultaneous inputs on leads 394, 396 and 397, an output is produced on lead 398 which is applied to gate 400 in Fig. 5.

The operation of the error-correction circuitry is as follows. It will be recalled that the error-correction roll call consists of a sequence of code pairs, each pair comprising a channel identity code and a line identity code. The channel identity codes are advanced by one in successive pairs proceeding from one through thirty-six in regular succession. The line identity codes, on the other hand, identify the talker who has been assigned to the paired channel at the TASI transmitter. Each channel code must therefore be followed by the identity code of the assigned talker. This characteristic of the error-correction code is utilized in the following manner.

Each channel identity code in the error-correction roll call is written into channel code register 391 by the operation of gate 386. Each time this channel code is generated by counter 313 and applied to cable 314, an output is produced on lead 396 of compare circuit 392. Monostable circuit 393 is simultaneously triggered to produce an output on lead 394 for an interval of approximately thirty milliseconds. If a valid talker identity code is thereafter received, a signal is produced on lead 397. AND gate 395 will, therefore, be fully enabled each time a valid channel code is followed within thirty milliseconds by a valid line code but only for the brief interval that counter 313 is generating the same channel code. The signal on lead 398 operates gate 400 to transfer the error-correction line code from translator 379 to line code memory 336 by way of cable 401.

In this way the line code of the error-correction roll call is substituted for the original code assigned in line code memory 336 by way of the connect signal receivers. If these codes are in agreement, indicating that no error exists, no change in the switching sequence will occur and the listener will continue to receive speech samples from the same transmission channel. If these codes are not in agreement, indicating an error, the error-correction line code will be substituted for the original code and the connections will be corrected accordingly. Such corrections take place within a period of approximately one second, that is, the time required to transmit one entire roll call on the control channel.

From the above description it can be seen that the information received on the control channel in the form of multifrequency coded tone bursts is utilized to control disconnect and error-correction operations. The required sorting and timing of the disconnect and error-correction operations are controlled by the identifying circuit 374, the binary counter 313 and the associated compare circuits. It will be noted, however, that this timing and sorting is accomplished entirely on a local basis without recourse to any information from the transmitter other than the basic disconnection and error-correction codes. In this way, the control of the complex switching operation is accomplished with a minimum of circuitry. Furthermore, the efficient use of the control channel is assured by transmitting error-correction data at any time that the transmission facility is not required for disconnect signaling. As has been previously described, this arrangement insures that errors will persist for only a brief interval whether the TASI system is under a heavy or light load.

While the signaling system of the present invention has been described in connection with a time assignment speech interpolation system, it is to be understood that this embodiment is simply illustrative of the many possible arrangements which can represent applications of the principles of the invention. These other arrangements can readily be devised in accordance with these principles by those skilled in the art without departing from the spirit and scope of the invention.

What is claimed is:

1. In a time assignment speech interpolation system for interconnecting a plurality of signal sources with a corresponding plurality of utilization means through a lesser plurality of transmission channels, said system including means for encoding the identities of said signal sources and means for transmitting said identities over said transmission channels, assignment control means which comprises an assignment control channel, means for generating disconnect signals identifying instantaneous idle ones of said signal sources, means for transmitting said disconnect signals immediately upon their generation on said control channel to effect the disconnection of the utilization means corresponding to the identified one of said signal sources, means for generating the identities of the connected ones of said signal sources, and means for transmitting said signal source identities on said control chanel to effect corrections in the connections to said utilization means when and only when said disconnect signal transmission means is inactive.

2. In a transmission system requiring a plurality of classes of supervisory functions, said supervisory functions being instantaneously related to the operation of said system, supervisory signal transmission means, means for generating a supervisory signal representing each of said functions, means for dividing the transmission time of said signal transmission means among all of said classes in proportion to the instantaneous requirements of each, means for reapportioning the transmission time of said signal transmission means among said classes in response to changes in said instantaneous requirements, and means for transmitting said supervisory signals over said signal transmission means only during the time apportioned to the class of function to which it belongs.

3. The combination according to claim 2 further including means for giving at least one of said classes of functions priority over the remainder of said classes.

4. In a time assignment speech interpolation system, switching means for simultaneously connecting instantaneously active ones of a plurality of signal sources and corresponding ones of an equal plurality of utilization means to a lesser plurality of signal transmission means, a supervisory channel, means for transmitting disconnect signals over said supervisory channel when and only when the number of said sources which have become active exceeds a preselected number less than said lesser plurality, means for encoding representations of the connections provided by said switching means, and means for transmitting said representations over said supervisory channel when and only when the number of said sources which have become active is less than said preselected number.

5. A time assignment speech interpolation transmitter comprising a plurality of signal sources, a lesser plurality of transmission channels, detecting means for determining the activity of each of said signal sources, means responsive to said detecting means for connecting instantaneously active ones of said signal sources to available ones of said transmission channels to form source-channel pairs, means for disconnecting instantaneously inactive ones of said signal sources from said transmission channels when and only when the number of simultaneously connected signal sources exceeds a preselected value, a supervisory channel, means for generating identifications of disconnected ones of said transmission channels, means for transmitting said disconnected channel identifications over said supervisory channel when generated, means for generating identifications of said source-channel pairs, and means for transmitting said pair identifications over said supervisory channel when and only when said number is less than said preselected value.

6. In a destination-coded multiplex transmission system, a plurality of signal sources, a multiplex transmission facility, means for interpolating signals from active ones of said sources on said facility, a supervisory channel, means for generating a connect supervisory signal at the initiation of activity of each of said sources, means for transmitting said connect signals over said transmission facility immediately preceding signals from said active sources, means for generating a disconnect supervisory signal at the termination of the interpolation of signals from each of said sources, means for transmitting said disconnect signals over said supervisory channel immediately following the interpolation of signals from said sources, means for generating verification signals representing the operation of said interpolating means, means for transmitting said verification signals over said supervisory channel, and means for disabling said verification signal transmitting means during the operation of said disconnect signal transmission means.

7. In a time assignment speech interpolation system, a plurality of subscriber substations each including a speech signal source, a lesser plurality of telephone lines, speech detector means for classifying each of said sources as active or inactive, means for generating a coded identification of each of said sources as it becomes instantaneously active, memory means including a storage position for each of said telephone lines, means for writing each of said coded identifications into a unique one of said storage positions to provide a source-line assignment, switching means controlled by said memory means for connecting each assigned source to its assigned line, means for erasing one of said coded identifications from said memory means each time the number of said assignments exceeds a preselected value, means for generating a coded identification of the line assigned to each source identification so erased, supervisory signal transmission means, means for transmitting each of said line identifications over said supervisory signal transmission means as it is generated, means for generating coded representations of each of said source-line assignments, and means for transmitting said assignment representations over said supervisory signal transmission means only during idle periods of said erasing means.

8. The combination according to claim 7 in which said line code and said assignment code generating means each comprise means for generating multifrequency tone bursts coded by permutations in the presence of a plurality of discrete frequencies.

9. The combination according to claim 8 in which each of said code generating means comprises means for generating one and only one tone out of each of a plurality of subgroups of tones to form a multitone code having redundant error detecting characteristics.

References Cited in the file of this patent

UNITED STATES PATENTS

| | | |
|---|---|---|
| 2,541,932 | Melhose | Feb. 13, 1951 |
| 2,754,367 | Levy | July 10, 1956 |